United States Patent
Tong et al.

(10) Patent No.: US 7,924,935 B2
(45) Date of Patent: Apr. 12, 2011

(54) CHANNEL SOUNDING IN OFDMA SYSTEM

(75) Inventors: Wen Tong, Ottawa (CA); Jianglei Ma, Kanata (CA); Ming Jia, Ottawa (CA); Peiying Zhu, Kanata (CA); Hang Zhang, Nepean (CA); Dongsheng Yu, Ottawa (CA); Hua Xu, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 936 days.

(21) Appl. No.: 11/663,946

(22) PCT Filed: Sep. 29, 2005

(86) PCT No.: PCT/CA2005/001474
§ 371 (c)(1),
(2), (4) Date: Mar. 27, 2007

(87) PCT Pub. No.: WO2006/034577
PCT Pub. Date: Apr. 6, 2006

(65) Prior Publication Data
US 2008/0095223 A1 Apr. 24, 2008

Related U.S. Application Data

(60) Provisional application No. 60/614,621, filed on Sep. 30, 2004, provisional application No. 60/642,697, filed on Jan. 10, 2005.

(51) Int. Cl.
*H04B 7/02* (2006.01)
*H04L 1/02* (2006.01)
*H04K 1/10* (2006.01)
*H04L 27/28* (2006.01)

(52) U.S. Cl. ........................................ 375/267; 375/260
(58) Field of Classification Search .................. 370/203, 370/208, 330, 331, 343; 375/219, 267; 455/67.11, 455/450
See application file for complete search history.

(56) References Cited

U.S. PATENT DOCUMENTS

| | | | | |
|---|---|---|---|---|
| 5,867,478 A * | 2/1999 | Baum et al. | ................... | 370/203 |
| 6,374,288 B1 * | 4/2002 | Bhagavath et al. | ........... | 709/203 |
| 7,515,562 B2 * | 4/2009 | Lim et al. | ...................... | 370/331 |
| 7,564,829 B2 * | 7/2009 | Jin et al. | ........................ | 370/343 |
| 7,656,842 B2 * | 2/2010 | Thomas et al. | ............... | 370/334 |
| 2002/0118783 A1 * | 8/2002 | Cripps et al. | ................... | 375/347 |
| 2004/0001429 A1 * | 1/2004 | Ma et al. | ....................... | 370/210 |
| 2004/0120274 A1 * | 6/2004 | Petre et al. | ..................... | 370/320 |
| 2005/0084000 A1 * | 4/2005 | Krauss et al. | ................. | 375/148 |
| 2005/0190868 A1 * | 9/2005 | Khandekar et al. | ........... | 375/346 |

(Continued)

OTHER PUBLICATIONS

Joo et al., Uplink CQI channel for OFDMA PHY, Apr. 28, 2004, IEEE 802.16 Broadband Wireless Access Working Group <http://ieee802.org/16>.*

*Primary Examiner* — David C Payne
*Assistant Examiner* — Erin M File
(74) *Attorney, Agent, or Firm* — Dinsmore & Shohl LLP

(57) ABSTRACT

Method and apparatus for determining a downlink channel response in an orthogonal frequency division multiplexing access (OFDMA) system. The method and apparatus uses the uplink quality indication channel for determining the downlink channel response, or uses round trip pilot relay channel sounding. The uplink quality indication channel may comprise modified mini-tiles. The subscriber station using round trip pilot relay channel sounding sends composite transponder pilots after receiving the DL pilots.

46 Claims, 28 Drawing Sheets

U.S. PATENT DOCUMENTS

| | | | |
|---|---|---|---|
| 2005/0286402 A1* | 12/2005 | Byun et al. | 370/203 |
| 2005/0286408 A1* | 12/2005 | Jin et al. | 370/208 |
| 2006/0013185 A1* | 1/2006 | Seo et al. | 370/343 |
| 2006/0035643 A1* | 2/2006 | Vook et al. | 455/450 |
| 2006/0094435 A1* | 5/2006 | Thomas et al. | 455/450 |
| 2006/0109923 A1* | 5/2006 | Cai et al. | 375/260 |
| 2006/0135080 A1* | 6/2006 | Khandekar et al. | 455/69 |
| 2006/0285504 A1* | 12/2006 | Dong et al. | 370/254 |
| 2007/0171852 A1* | 7/2007 | George et al. | 370/328 |
| 2007/0263735 A1* | 11/2007 | Tong et al. | 375/260 |
| 2007/0281624 A1* | 12/2007 | Thomas et al. | 455/67.11 |
| 2008/0039107 A1* | 2/2008 | Ma et al. | 455/450 |
| 2008/0267271 A1* | 10/2008 | Vook et al. | 375/219 |
| 2008/0273494 A1* | 11/2008 | Vook et al. | 370/330 |
| 2009/0196164 A1* | 8/2009 | Vook et al. | 370/208 |
| 2010/0029265 A1* | 2/2010 | Khandekar et al. | 455/423 |

* cited by examiner (a)

(b)

(a)

6 sounding quality indication channel tiles (b)

Pilot  Data (a)

6 sounding quality indication channel tiles

Pilot for CH 1   Pilot for CH 2   Pilot for CH 3
Data for CH 1   Data for CH 2   Data for CH 3

(b)

(a)

(b)

CHANNEL SOUNDING IN OFDMA SYSTEM

CROSS-REFERENCE OF RELATED APPLICATION

This application claims benefit and priority from U.S. Provisional Application No. 60/614,621, filed on Sep. 30, 2004, and U.S. Provisional Application No. 60/642,697, filed on Jan. 10, 2005; both are incorporated herein by reference.

FIELD OF THE INVENTION

The present invention relates to the delivery of data via a wireless connection and, more particularly, to the accurate delivery of data at high rates via a wireless connection.

BACKGROUND OF THE INVENTION

Recent growth in demand for broadband wireless services enables rapid deployment of innovative, cost-effective, and interoperable multi-vendor broadband wireless access products, providing alternatives to wireline broadband access for applications such as telephony, personal communications systems (PCS) and high definition television (HDTV). At the same time, broadband wireless access has been extended from fixed to mobile subscriber stations, for example at vehicular speed. Though the demand for these services is growing, the channel bandwidth over which the data may be delivered is limited. Therefore, it is desirable to deliver data at high speeds over this limited bandwidth in an efficient, as well as cost effective, manner.

In the ever-continuing effort to increase data rates and capacity of wireless networks, communication technologies evolve. An encouraging solution for the next generation broadband wireless access delivering high speed data over a channel is by using Orthogonal Frequency Division Multiplexing (OFDM). The high-speed data signals are divided into tens or hundreds of lower speed signals that are transmitted in parallel over respective frequencies within a radio frequency (RF) signal that are known as subcarrier frequencies ("subcarriers"). The frequency spectra of the subcarriers may overlap so that the spacing between them is minimized. The subcarriers are also orthogonal to each other so that they are statistically independent and do not create crosstalk or otherwise interfere with each other. When all of the allocated spectrum can be used by all base stations, the channel bandwidth is used much more efficiently than in conventional single carrier transmission schemes such as AM/FM (amplitude or frequency modulation), in which only one signal at a time is sent using only one radio frequency, or frequency division multiplexing (FDM), in which portions of the channel bandwidth are not used so that the subcarrier frequencies are separated and isolated to avoid inter-carrier interference (ICI).

In OFDM, each block of data is converted into parallel form and mapped into each subcarrier as frequency domain symbols. To get time domain signals for transmission, an inverse discrete Fourier transform or its fast version, IFFT, is applied to the symbols. The symbol duration is much longer than the length of the channel impulse response so that inter-symbol interference is avoided by inserting a cyclic prefix for each OFDM symbol. Thus, OFDM is much less susceptible to data loss caused by multipath fading than other known techniques for data transmission. Also, the coding of data onto the OFDM subcarriers takes advantage of frequency diversity to mitigate loss from frequency-selective fading when forward error correction (FEC) is applied.

Another approach to providing more efficient use of the channel bandwidth is to transmit the data using a base station having multiple antennas and then receive the transmitted data using a remote station having multiple receiving antennas, referred to as Multiple Input-Multiple Output (MIMO). The data may be transmitted such that there is spatial diversity between the signals transmitted by the respective antennas, thereby increasing the data capacity by increasing the number of antennas. Alternatively, the data is transmitted such that there is temporal diversity between the signals transmitted by the respective antennas, thereby reducing signal fading.

In orthogonal frequency division multiplexing access (OFDMA) systems, multiple users are allowed to transmit simultaneously on the different subcarriers per OFDM symbol. In an OFDMA/TDMA embodiment, for example, the OFDM symbols are allocated by a time division multiplexing access (TDMA) method in the time domain, and the subcarriers within OFDM symbols are divided in frequency domain into subsets of subcarriers, each subset is termed a subchannel.

Information theoretic analysis suggests that additional performance can be extracted in the presence of channel state information at the transmitter (CSIT). Closed-loop transmission strategies use, for example, knowledge of the channel at the transmitter to improve link performance, reliability, and range. For a base station with one transmit antenna, channel knowledge provides a means to determine the quality of the channel response across the signal bandwidth for the purpose of selecting the best portion of the band on which to transmit. Channel knowledge may also be used by a base station to transmit data streams to multiple subscriber stations on the same time-frequency resources. In MIMO applications, closed loop transmission methods are much more robust to channels that lack adequate scattering compared with open-loop MIMO methods.

One method of providing channel information to the transmitter is for a subscriber station to measure the downlink (DL) channel and transmitting a feedback message to the base station. The feedback message contains information enabling the base station to perform the closed-loop transmission on the DL. In broadband channels, the amount of feedback information needed can be significant.

On the other hand, channel sounding is a signaling mechanism where a subscriber station transmits channel sounding waveforms on the uplink to enable the base station to determine the base station to subscriber station channel response. Channel sounding assumes the reciprocity of the uplink and downlink channels, which is generally the case in Time Division Duplexing (TDD) systems where the transmit and receive hardware are appropriately calibrated.

Since the frequency bandwidth of the uplink (UL) transmissions encompasses the occupied bandwidth of the downlink transmission, channel sounding leverages uplink data transmissions without additional overhead.

However, since all CSIT capable subscriber stations need to perform channel sounding, a significant overhead is introduced. In broadband wireless networks, where the frequency domain consists of many sub-bands, each sub-band requires a channel feedback. Therefore, requirement for feedback resource, in particular in case of MIMO where feedback is required for example for beam forming, is significant.

Accordingly, there is a need to provide an improved channel sounding design, method and apparatus to an OFDMA system.

SUMMARY OF THE INVENTION

The present invention provides a method for determining a channel response in an orthogonal frequency division multiplexing access (OFDMA) system comprising the steps of: a) constructing an OFDMA frame having a quality indication channel; b) instructing a subscriber station to transmit a quality indication signal in the quality indication channel; c) determining an uplink channel response based on the quality indication signal; and d) estimating a downlink channel response based on the uplink channel response. Preferably, the quality indication channel is a modified quality indication channel with mini-tiles selected from uplink tiles of an uplink subchannel. Preferably, the method further has the step of concatenating uplink subchannels to generate quality indication channels.

In accordance with one aspect of the present invention there is provided a method for determining a channel response in an orthogonal frequency division multiplexing access (OFDMA) system comprising the steps of: a) constructing an OFDMA frame having a downlink sounding pilot at a base station; b) transmitting the downlink sounding pilot over a downlink (channel; c) receiving the downlink sounding pilot at a subscriber station; c) applying the received downlink sounding pilot as uplink sounding symbol resulting a composite transponder pilot; d) transmitting the composite transponder pilot and an uplink pilot over an uplink channel; e) receiving the composite transponder pilot at the base station; f) receiving the uplink pilot at the base station; and g) determining a down link channel response from the received composite transponder pilot and the received uplink pilot.

In accordance with another aspect of the present invention there is provided an orthogonal frequency division multiplexing access (OFDMA) system comprising: a subscriber station adapted to transmit a quality indication signal in a quality indication channel; and a base station adapted to receive the quality indication channel. The base station determines an uplink channel response based on the quality indication signal; and estimates a downlink channel response based on the uplink channel response. Preferably, the quality indication channel is a modified quality indication channel with mini-tiles selected from uplink tiles of a uplink subchannel, and uplink subchannels are concatenated to generate quality indication channels.

In accordance with another aspect of the present invention there is an orthogonal frequency division multiplexing access (OFDMA) system comprising: a base station adapted to transmit a downlink sounding pilot; and to receive a composite transponder pilot and an uplink pilot. The base station determines a down link channel response from a received composite transponder pilot and a received uplink pilot; and a subscriber station being adapted to receive the downlink sounding pilot; the subscriber station applying the received downlink sounding pilot as uplink sounding symbol resulting a composite transponder pilot, and transmitting the composite transponder pilot and an uplink pilot over an uplink channel.

In accordance with another aspect of the present invention there is a base station in an orthogonal frequency division multiplexing access (OFDMA) system comprising: a first circuitry for instructing a subscriber station to transmit a quality indication signal in a quality indication channel; receiver for receiving the quality indication signal; a second circuitry for determining an uplink channel response based on the quality indication signal; and a third circuitry for estimating a downlink channel response based on the uplink channel response.

In accordance with another aspect of the present invention there is a base station in an orthogonal frequency division multiplexing access (OFDMA) system comprising: a transmitter for transmitting a downlink sounding pilot over a downlink channel; a receiver for receiving a composite transponder pilot; and an uplink pilot at the base station; the composite transponder pilot resulting from the downlink sounding pilot being applied as uplink sounding symbol; and a circuitry for determining a down link channel response from the received composite transponder pilot and the received uplink pilot.

BRIEF DESCRIPTION OF THE DRAWING FIGURES

The invention and the illustrated embodiments may be better understood, and the numerous objects, advantages, and features of the present invention and illustrated embodiments will become apparent to those skilled in the art by reference to the accompanying drawings. In the drawings, like reference numerals refer to like parts throughout the various views of the non-limiting and non-exhaustive embodiments of the present invention, and wherein:

FIG. 6 (*b*) shows an example of a basic structure of an OFDMA symbol in frequency domain;

FIG. 9 (*b*) shows an example of a tile in PUSC;

FIG. 9 (*c*) shows an example of a tile in optional PUSC;

FIG. 10 (*b*) depicts the composition of modified quality indication channel for PUSC;

FIG. 11 (*b*) depicts the construction of modified quality indication channel for optional PUSC;

FIG. 12 (*b*) shows the construction of MIMO modified quality indication channel for PUSC;

FIG. 13 (*b*) shows the construction of MIMO modified quality indication channel for optional PUSC;

DETAILED DESCRIPTION OF THE PREFERRED EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The term "subscriber station" is intended to include any device which may provide connectivity between subscriber equipment and a base station (base station). A subscriber station may be fixed, or mobile. When the subscriber station is mobile, the speed of its mobile carrier should be apparent to a person skilled in the art, for example, the speed of an automobile, an aircraft or a satellite. The term "base station" is intended to include generalized equipment set providing connectivity, management, and control of the subscriber station (SS).

Figure 1:
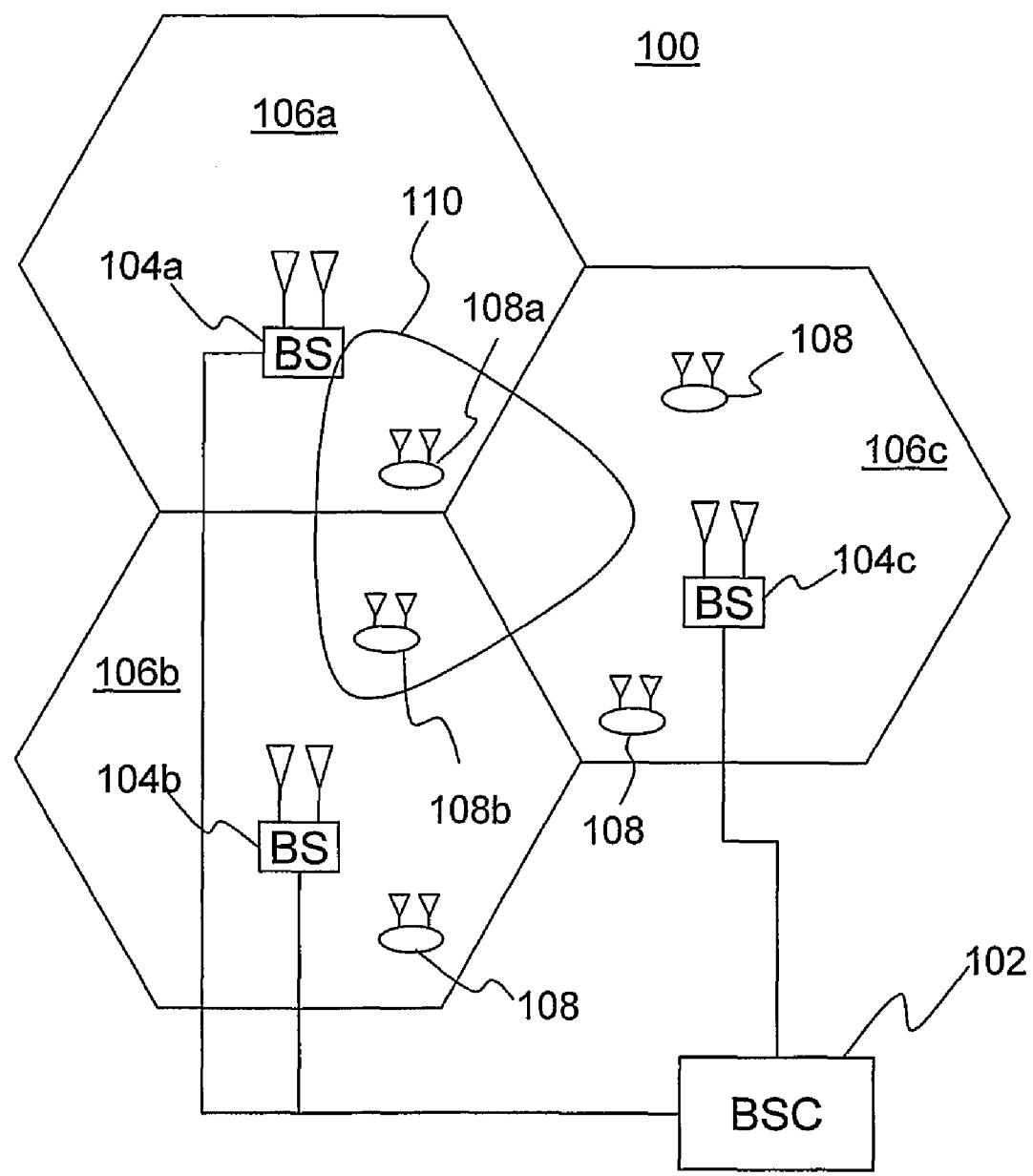
FIG. 1 is a block representation of a cellular communication system.

Referring to FIG. 1, in a wireless communication system 100 a base station controller (base station C) 102 controls base stations (base station) 104 within corresponding cells 106. In general, each base station 104 will facilitate communications with subscriber stations 108, which are within the cell 106 associated with the corresponding base station 104. As a subscriber station 108 moves from a first cell 106a to a second cell 106b, communications with the subscriber station 108 transition from one base station 104 to another. The term "handoff" is generally used to refer to techniques for switching from one base station 104 to another during a communication session with a subscriber station 106. The base stations 104 cooperate with the base station controller 102 to ensure that handoffs are properly orchestrated, and that data intended for the subscriber station 108 is provided to the appropriate base station 104 currently supporting communications with the subscriber station 108.

In FIG. 1, a handoff area 110 is illustrated at the junction of three cells 106, wherein a subscriber station 108b is at the edge of any one of the three cells 106 and could potentially be supported by any of the base stations 104a, 104b and 104c within those cells 106a, 106b and 106c. The present invention provides a method and architecture for preambles used in orthogonal frequency division multiplexing access (OFDMA) wireless communication environment. Orthogonal frequency division multiplexing access (OFDMA) allows multiple users, for example subscriber station 108a and 108b, to transmit simultaneously on the different subcarriers per OFDM symbol. The subcarriers within an OFDM symbol are divided by OFDMA method in frequency domain into subsets of subcarriers, which is termed a subchannel. These subchannels are the basic allocation unit. Each allocation of a subchannel may be allocated for several OFDM symbols in such a way that the estimation of each subchannel is done in frequency and time. The subchannel may be spread over the entire bandwidth. Therefore, in the OFDMA/TDMA embodiment, OFDM symbols are shared both in time and in frequency (by subchannel allocation) between different users.

Figure 2:
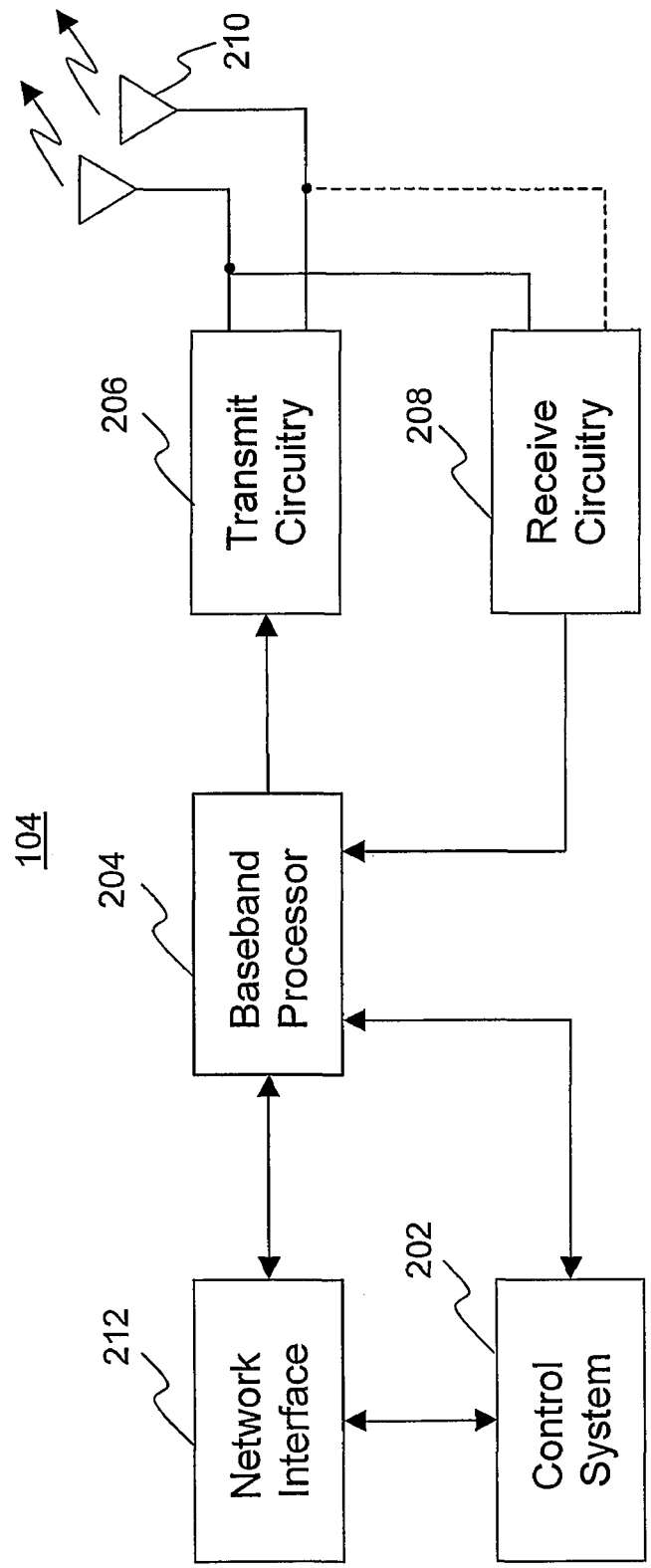
FIG. 2 is a block representation of a base station according to one embodiment of the present invention.

A high level overview of the subscriber stations 108 and base stations 104 of the present invention is provided prior to delving into the structural and functional details of the preferred embodiments. With reference to FIG. 2, a base station 104 configured according to one embodiment of the present invention is illustrated. The base station 104 generally includes a control system 202, a baseband processor 204, transmit circuitry 206, receive circuitry 208, multiple antennas 210, and a network interface 212. The receive circuitry 208 receives radio frequency signals bearing information from one or more remote transmitters provided by subscriber stations 108 (illustrated in FIG. 3). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 204 processes the digitized received signal to extract the information or data bits conveyed in the received signal. This processing typically comprises demodulation, decoding, and error correction operations. As such, the baseband processor 204 is generally implemented in one or more digital signal processors (DSPs). The received information is then sent across a wireless network via the network interface 212 or transmitted to another subscriber station 108 serviced by the base station 104. The network interface 212 will typically interact with the base station controller and a circuit-switched network forming a part of a wireless network, which may be coupled to the public switched telephone network (PSTN) or Internet Protocol (IP) network.

On the transmit side, the baseband processor 204 receives digitized data, which may represent voice, data, or control information, from the network interface 212 under the control of control system 202, which encodes the data for transmission. The encoded data is output to the transmit circuitry 206, where it is modulated by a carrier signal having a desired transmit frequency or frequencies. A power amplifier (not shown) will amplify the modulated carrier signal to a level appropriate for transmission, and deliver the modulated carrier signal to the antennas 210 through a matching network (not shown). Modulation and processing details are described in greater detail below.

Figure 3:
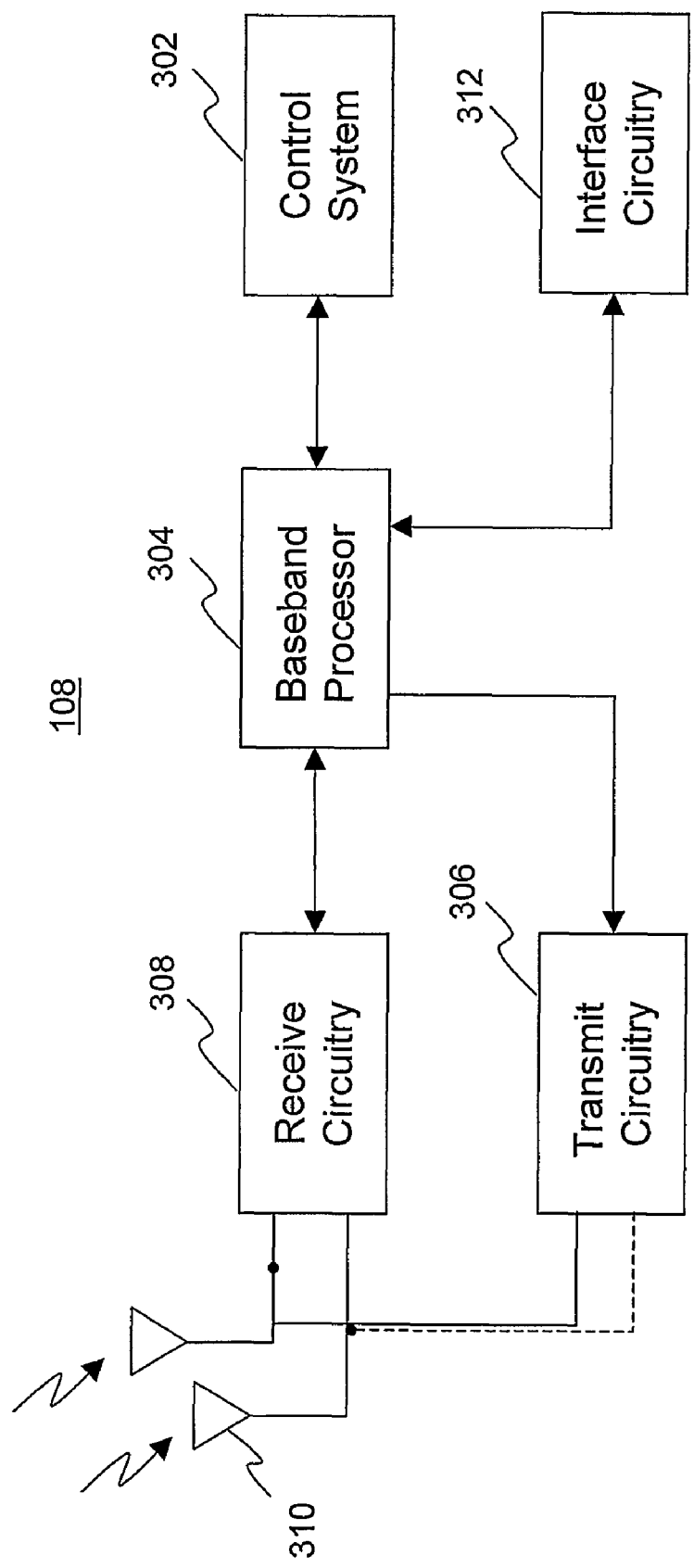
FIG. 3 is a block representation of a subscriber station according to one embodiment of the present invention.

With reference to FIG. 3, a subscriber station 108 configured according to one embodiment of the present invention is illustrated. Similarly to the base station 104, the subscriber station 108 will include a control system 302, a baseband processor 304, transmit circuitry 306, receive circuitry 308, multiple antennas 310, and user interface circuitry 312. The receive circuitry 308 receives radio frequency signals bearing information from one or more base stations 104. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 304 processes the digitized received signal to extract the information or data bits conveyed in the received signal. This processing typically comprises demodulation, decoding, and error correction operations, as will be discussed in greater detail below. The baseband processor 304 is generally implemented in one or more digital signal processors (DSPs) and application specific integrated circuit (ASIC).

For transmission, the baseband processor 304 receives digitized data, which may represent voice, data, or control information, from the control system 302, which it encodes for transmission. The encoded data is output to the transmit circuitry 305, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are applicable to the present invention.

In OFDM modulation, the transmission band is divided into multiple, orthogonal subcarrier waves. Each subcarrier wave is modulated according to the digital data to be transmitted. Because OFDM divides the transmission band into multiple subcarriers, the bandwidth per carrier decreases and the modulation time per carrier increases. Since the multiple subcarriers are transmitted in parallel, the transmission rate for the digital data, or symbols, on any given carrier is lower than when a single subcarrier is used.

OFDM modulation requires the performance of an Inverse Fast Fourier Transform (IFFT) on the information to be transmitted. For demodulation, the performance of a Fast Fourier Transform (FFT) on the received signal is required to recover the transmitted information. In practice, the Inverse Discrete Fourier Transform (IDFT) and Discrete Fourier Transform (DFT) may be implemented using digital signal processing for modulation and demodulation, respectively.

Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

Figure 4:
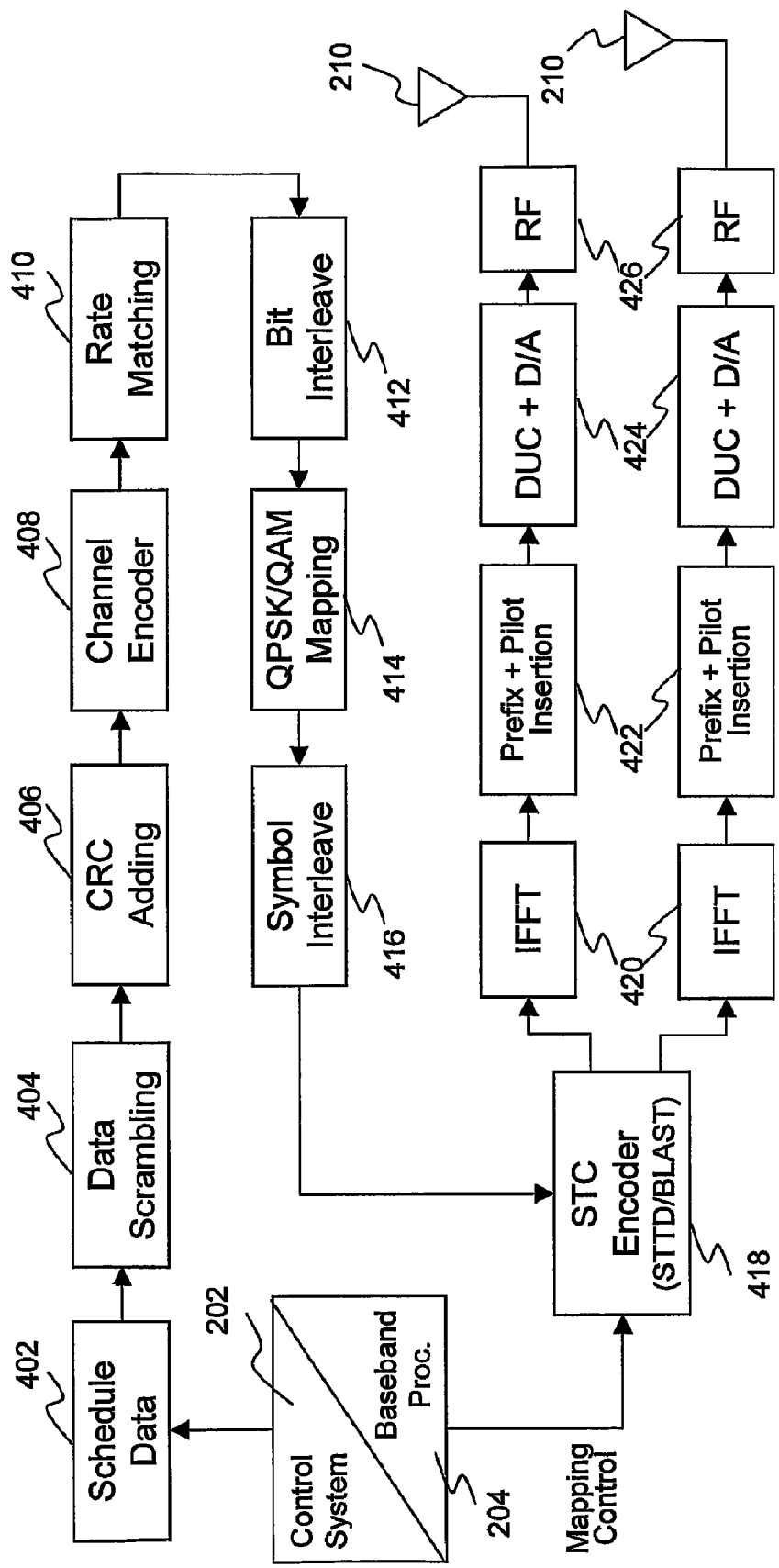
FIG. 4 is a logical breakdown of an OFDMA transmitter architecture according to one embodiment of the present invention.

With reference to FIG. 4, a logical OFDM transmission architecture is provided according to one embodiment. Initially, data 402 to be transmitted to a subscriber station 108 is received at the base station 104. The data is scrambled in a manner reducing the peak-to-average power ratio associated with the data using data scrambling logic 404. A cyclic redundancy check (CRC) for the scrambled data is determined and appended to the scrambled data using CRC logic 406. Next, channel coding is performed using channel encoder logic 408 to effectively add redundancy to the data to facilitate recovery and error correction at the subscriber station 108. The channel encoder logic 408 may use forward error correction techniques such as concatenated Reed-Solomon-convolutional code (RS-CC), block turbo coding (BTC) or convolutional turbo codes (CTC). The encoded data is then processed by rate matching logic 410 to compensate for the data expansion associated with encoding.

Bit interleaver logic 412 systematically reorders the bits in the encoded data to ensure that adjacent coded bits are mapped onto nonadjacent subcarriers, thereby to minimize the loss of consecutive data bits. This is considered the first step of a two step permutation. All encoded data bits shall be interleaved by a block interleaver with a block size corresponding to the number of coded bits per allocated subchannels per OFDM symbol. The second step ensures that adjacent coded bits are mapped alternately onto less or more significant bits of the constellation, thus avoiding long runs of lowly reliable bits.

The resultant data bits are mapped into corresponding symbols depending on the chosen baseband modulation by mapping logic 414. Binary Phase Shift Key (BPSK), Quadrature Amplitude Modulation (QAM), for example, 16-QAM and 64-QAM, or Quadrature Phase Shift Key (QPSK), for example, Gray mapped QPSK modulation may be used. When QAM is used, the subchannels are mapped onto corresponding complex-valued points in a $2^m$-ary constellation. A corresponding complex-valued $2^m$-ary QAM sub-symbol, $c_k=a_k+jb_k$, that represent a discrete value of phase and amplitude, where—$N \leq k \leq N$, is assigned to represent each of the sub-segments such that a sequence of frequency-domain sub-symbols is generated.

Each of the complex-valued, frequency-domain sub-symbols $c_k$ is used to modulate the phase and amplitude of a corresponding one of 2N+1 subcarrier frequencies over a symbol interval $T_s$.

The modulated subcarriers are each modulated according to a sinc x=(sin x)/x function in the frequency domain, with a spacing of $1/T_s$ between the primary peaks of the subcarriers, so that the primary peak of a respective subcarrier coincides with a null of the adjacent subcarriers. Thus, the modulated subcarriers are orthogonal to one another though their spectra overlap.

The symbols may be systematically reordered to further bolster the immunity of the transmitted signal to periodic data loss caused by frequency selective fading using symbol interleaver logic 416. For this purpose, specific Reed-Solomon permutation may be used to make the subchannels as independent as possible from each other. The independence of the subchannel allocation gives maximum robustness and statistically spreading interference between neighboring cells as well as neighboring carriers between two channels and statistically spreading the interference inside the cell.

At this point, groups of bits have been mapped into symbols representing locations in an amplitude and phase constellation. The STC encoder logic 418 will process the incoming symbols and provide n outputs corresponding to the number of transmit antennas 210 for the base station 104. The control system 202 and/or baseband processor 204 will provide a mapping control signal to control STC encoding. At this point, assume the symbols for the n outputs are representative of the data to be transmitted and capable of being recovered by the subscriber station 108.

For the present example, assume the base station 104 has two antennas 210 (n=2) and the STC encoder logic 418 provides two output streams of symbols. Accordingly, each of the symbol streams output by the STC encoder logic 418 is sent to a corresponding IFFT processor 420, illustrated separately for ease of understanding. Those skilled in the art will recognize that one or more processors may be used to provide such digital signal processing alone or in combination with other processing described herein. The IFFT processors 420 will preferably operate on the respective symbols using IDFT or like processing to effect an inverse Fourier Transform. The output of the IFFT processors 420 provides symbols in the time domain.

It should be apparent to a person skilled in the art that the STC encoder may be a space time transmit diversity (STTD) encoder or a spatial multiplexing (SM) encoder employing, for example, Bell Labs Layered Space-Time (BLAST).

The time domain symbols are grouped into frames, which are associated with prefix and pilot headers by insertion logic 422. Each of the resultant signals is up-converted in the digital domain to an intermediate frequency and converted to an analog signal via the corresponding digital up-conversion (DUC) and digital-to-analog (D/A) conversion circuitry 424. The resultant (analog) signals are then simultaneously modulated at the desired RF frequency, amplified, and transmitted via the RF circuitry 426 and antennas 210. Notably, the transmitted data is preceded by pilot signals, which are known by the intended subscriber station 108 and implemented by modulating the pilot header and scattered pilot subcarriers. The subscriber station 108, which is discussed in detail below, will use the scattered pilot signals for channel estimation and interference suppression and the header for identification of the base station 104.

Figure 5:
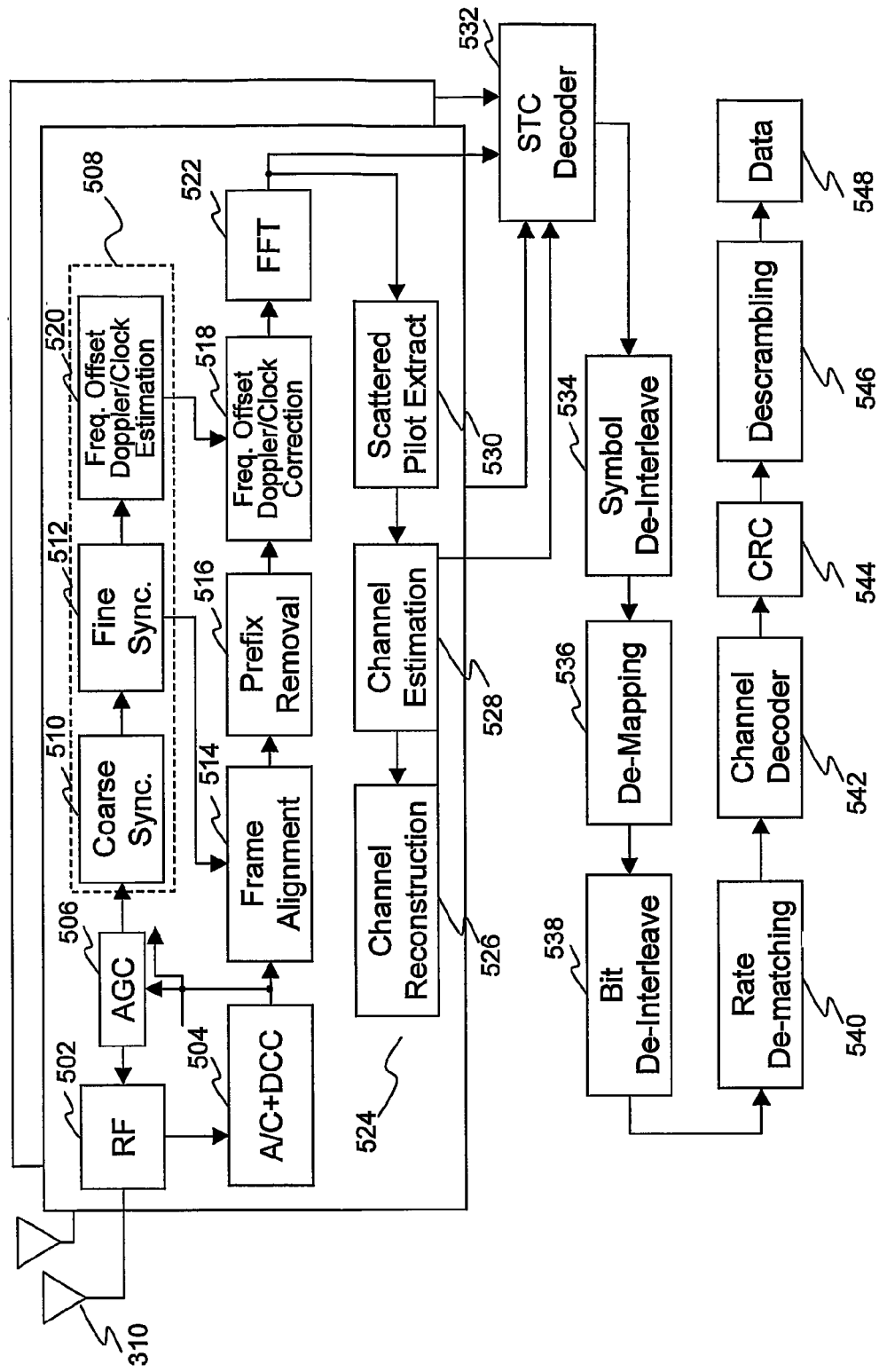
FIG. 5 is a logical breakdown of an OFDMA receiver architecture according to one embodiment of the present invention.

Reference is now made to FIG. 5 to illustrate reception of the transmitted signals by a subscriber station 108. Upon arrival of the transmitted signals at each of the antennas 310 of the subscriber station 108, the respective signals are demodulated and amplified by corresponding RF circuitry 502. For the sake of conciseness and clarity, only one of the two receive paths is described and illustrated in detail. Analog-to-digital (A/D) converter and down-conversion circuitry 504 digitizes and downconverts the analog signal for digital processing. The resultant digitized signal may be used by automatic gain control circuitry (AGC) 506 to control the gain of the amplifiers in the RF circuitry 502 based on the received signal level.

Preferably, each transmitted frame has a defined structure having two identical headers. Framing acquisition is based on the repetition of these identical headers. Initially, the digitized signal is provided to synchronization logic 508, which includes coarse synchronization logic 510, which buffers several OFDM symbols and calculates an auto-correlation between the two successive OFDM symbols. A resultant time index corresponding to the maximum of the correlation result determines a fine synchronization search window, which is used by the fine synchronization logic 512 to determine a precise framing starting position based on the headers. The output of the fine synchronization logic 512 facilitates frequency acquisition by the frequency alignment logic 514. Proper frequency alignment is important so that subsequent FFT processing provides an accurate conversion from the time to the frequency domain. The fine synchronization algorithm is based on the correlation between the received pilot signals carried by the headers and a local copy of the known pilot data. Once frequency alignment acquisition occurs, the prefix of the OFDM symbol is removed with prefix removal logic 516 and resultant samples are sent to frequency offset and Doppler correction logic 518, which compensates for the system frequency offset caused by the unmatched local oscillators in the transmitter and the receiver and Doppler effects imposed on the transmitted signals. Preferably, the synchronization logic 508 includes frequency offset, Doppler, and clock estimation logic 520, which is based on the headers to help estimate such effects on the transmitted signal and provide those estimations to the correction logic 518 to properly process OFDM symbols.

At this point, the OFDM symbols in the time domain are ready for conversion to the frequency domain using the FFT processing logic 522. The results are frequency domain symbols, which are sent to processing logic 524. The processing logic 524 extracts the scattered pilot signal using scattered pilot extraction logic 526, determines a channel estimate based on the extracted pilot signal using channel estimation logic 528, and provides channel responses for all subcarriers using channel reconstruction logic 530. The frequency domain symbols and channel reconstruction information for each receive path are provided to an STC decoder 532, which provides STC decoding on both received paths to recover the transmitted symbols. The channel reconstruction information provides the STC decoder 532 sufficient information to process the respective frequency domain symbols to remove the effects of the transmission channel.

The recovered symbols are placed back in order using the symbol de-interleaver logic 534, which corresponds to the symbol interleaver logic 416 of the transmitter. The de-interleaved symbols are then demodulated or de-mapped to a corresponding bitstream using de-mapping logic 536. The bits are then de-interleaved using bit de-interleaver logic 538, which corresponds to the bit interleaver logic 412 of the transmitter architecture. The de-interleaved bits are then processed by rate de-matching logic 540 and presented to channel decoder logic 542 to recover the initially scrambled data and the CRC checksum. Accordingly, CRC logic 544 removes the CRC checksum, checks the scrambled data in traditional fashion, and provides it to the de-scrambling logic 546 for de-scrambling using the known base station de-scrambling code to recover the originally transmitted data.

Orthogonal frequency division multiplexing access (OFDMA) allows multiple users to transmit simultaneously on the different subcarriers per OFDM symbol. In an OFDMA/TDMA embodiment, the OFDM symbols are allocated by TDMA method in the time domain, and the subcarriers within an OFDM symbols are divided by OFDMA method in frequency domain into subsets of subcarriers, each subset is termed a subchannel. The subcarriers forming one subchannel may, but need not be adjacent. These subchannels are the basic allocation unit. Each allocation of subchannel may be allocated for several OFDM symbols in such a way that the estimation of each subchannel is done in frequency and time. The subchannel may be spread over the entire bandwidth. This scheme achieves improved frequency diversity and channel usage without the need for frequency separation between subcarriers. The allocation of carriers to subchannel may be accomplished by special Reed-Solomon series, which enables the optimization and dispersion of interfering signals inside a cell and between adjacent cells. Therefore, in the OFDMA/TDMA embodiment, OFDM symbols are shared both in time and in frequency (by subchannel allocation) between different users. When the OFDMA is used in the uplink (UL), it allows users to operate with smaller power amplifiers, at expense of instantaneous data rate. On the other hand it allows allocating dynamically larger amounts of bandwidth to users capable of utilizing it in terms of the link budget. When applied to the downlink (DL), OFDMA allows transmitting to multiple users in parallel with designated data streams, and may improve the link budget of disadvantaged users by allocating to their subchannels a larger fraction of their downlink transmit power.

Unless defined otherwise, technical and scientific terms used herein have the same meaning as defined in IEEE 806.16-2004 and IEEE 806.16e (available at www.ieee802.org) which are incorporated by reference in their entireties.

Figure 6:
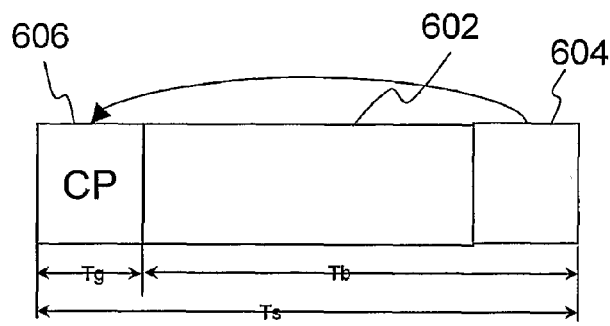
FIG. 6 (*a*) depicts an example of an OFDM symbol structure in time domain.
Figure 6:
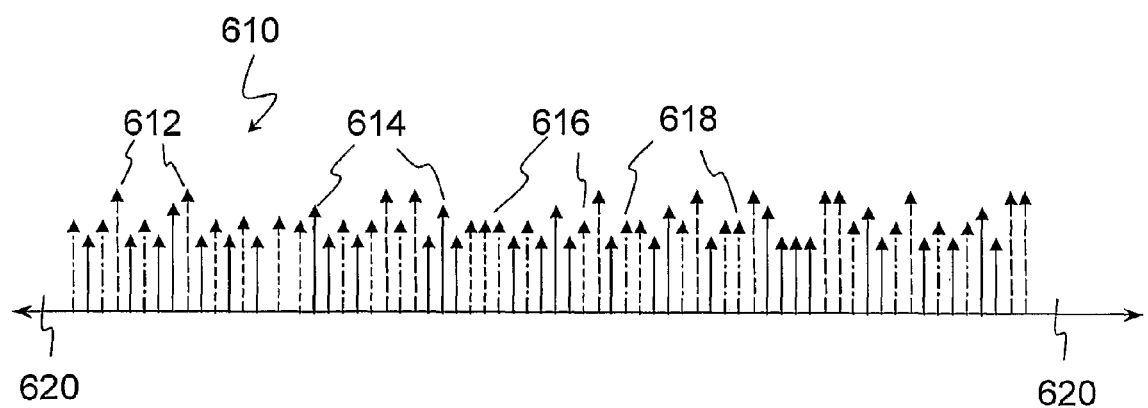

FIG. 6 (a) shows an example of an OFDMA symbol structure in time domain. OFDMA waveform is created by Inverse-Fourier-Transform. The time duration 602 is referred to as the useful symbol time $T_b$. A copy of a segment 604 (last $T_g$) of the useful symbol period 602, termed cyclic prefix (CP), is copied and appended to the beginning of the useful symbol time $T_b$ 603, and may be used to collect multipath, while maintaining the orthogonality of the tones. Using a cyclic extension, the samples required for performing the FFT at the receiver may have a small range of timing error, compared to the length of prefix, over the length of the extended symbol. This provides multipath immunity as well as a tolerance for symbol time synchronization errors.

An OFDMA symbol may be characterized by following primitive parameters: the nominal bandwidth (BW); the number of used subcarriers ($N_{used}$), for example, 1703; sampling factor n, which in conjunction with BW and $N_{used}$ determines the subcarrier spacing, and the useful symbol time, and the ratio of CP time $T_g$ to useful symbol time $T_b$ (G), for example, $\frac{1}{4}$, $\frac{1}{8}$, $\frac{1}{16}$ or $\frac{1}{32}$.

Based on the primitive parameters, other parameters could be derived: the FTT size $N_{FFT}$ which is the smallest power of two greater than $N_{used}$, for the above example of $N_{used}$=1703, $N_{FFT}$ is 2048; sampling frequency $F_S$=floor (n·8/7·BW/8000)×8000; Subcarrier spacing: $\Delta f = F_S/N_{FFT}$; useful symbol time: $T_b=1/\Delta f$; CP Time: $T_g=G \cdot T_b$; OFDMA Symbol Time: $T_s=T_b+T_g$; and sampling time: $T_b/N_{FFT}$.

Referring to FIG. 6 (b), a basic structure of an OFDMA symbol 610 is described in frequency domain. As discussed in the above, an OFDMA symbol is made up of subcarriers 612-618, the number of which generally correlates to the FFT size used. There may be several subcarrier types: data subcarriers 612, 616, 618 are used for data transmission; pilot subcarriers 614 are used for various estimation purposes; and null carrier has no transmission at all, for guard bands 620 and DC carrier. Guard bands 620 are used to enable the signal to naturally decay and create the FFT "brick wall" shaping. In OFDMA, active subcarriers are divided into subsets of subcarriers, each subset is termed a subchannel. The symbol is divided into subchannels to support scalability, multiple access, and advanced antenna array processing capabilities. In FIG. 6 (b), three distinct subchannels 612, 616, and 618 are illustrated. Tens and hundreds of subchannels may be implemented. In the downlink, a subchannel may be intended for different (groups of) receivers; in the uplink, a transmitter may be assigned one or more subchannels, several transmitters may transmit simultaneously. The subcarriers forming one subchannel may, but need not be adjacent.

Figure 7:
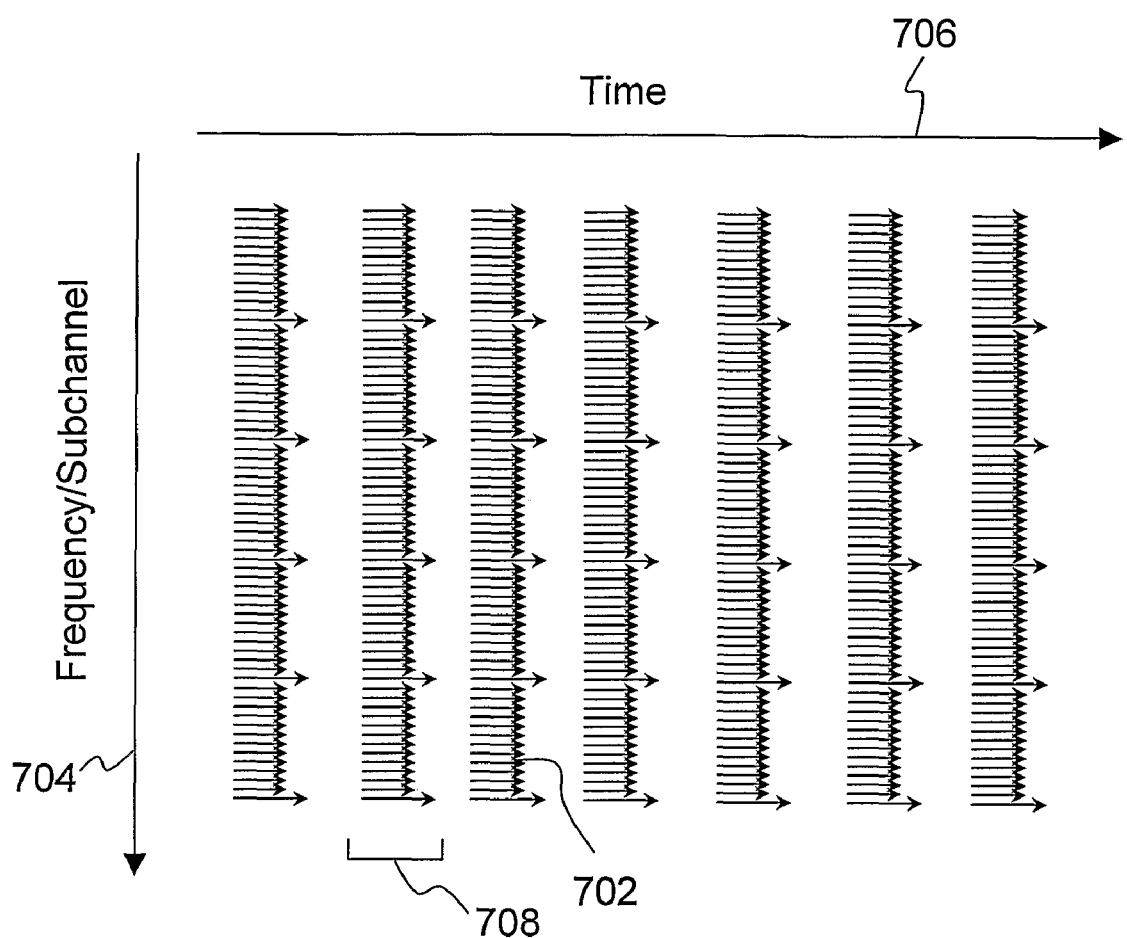
FIG. 7 shows an example of a subchannel arranged in frequency domain.

In FIG. 7, each horizontal arrow 702 in the frequency domain 704 represents a logical subchannel. The symbol is divided into subchannels to support scalability, multiple access, and advanced antenna array processing capabilities. A minimum number of symbols are allocated to one subchannel, this may be accomplished by special Reed-Solomon series, which enable the optimization and dispersion of interfering signals inside a cell and between adjacent cells. Each subchannel is the basic allocation unit that a user can be allocated. In the time domain 706, OFDM symbols 708 are shown as columns in FIG. 7.

Figure 8:
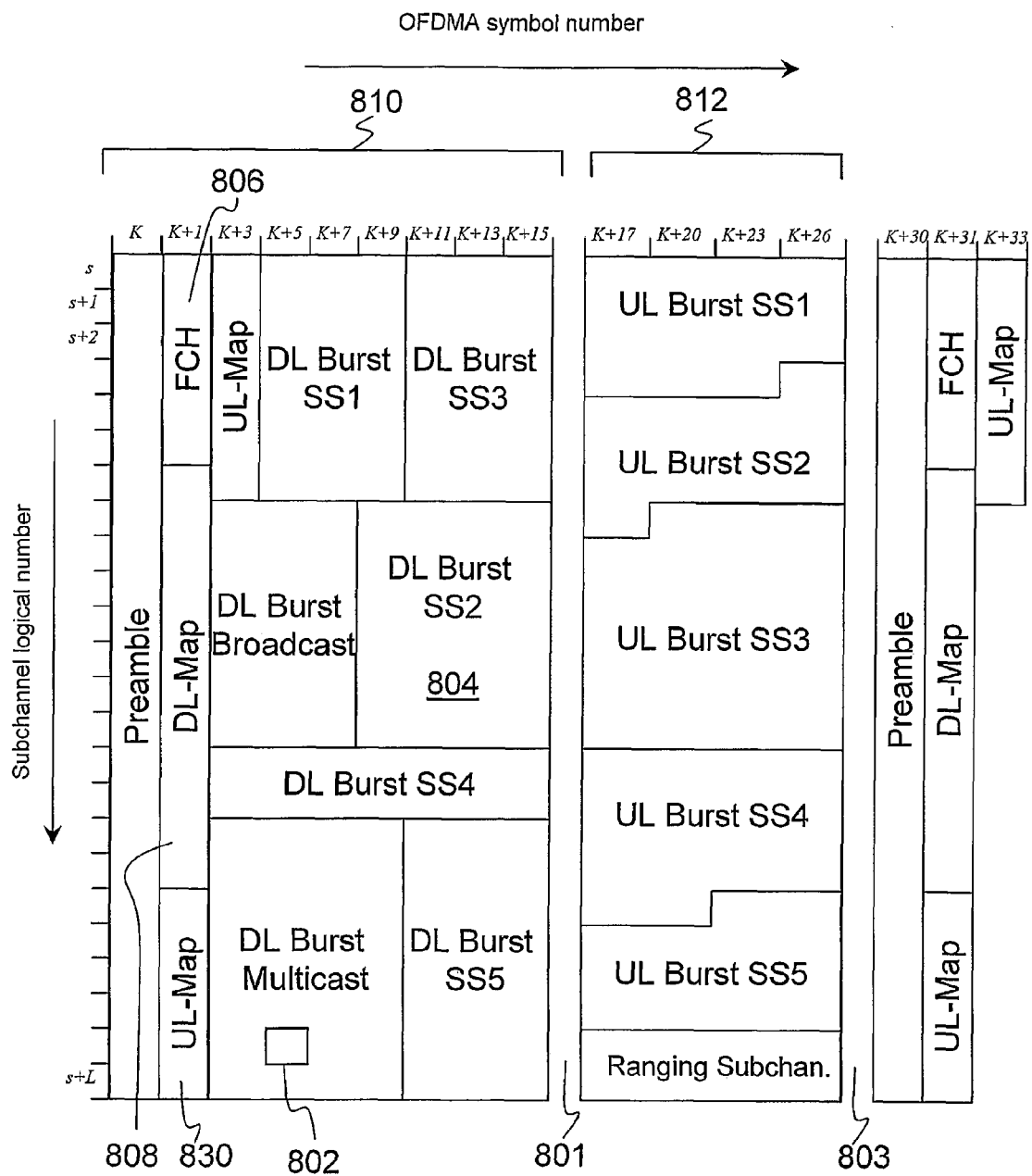
FIG. 8 shows a time plan for the OFDMA frame structure in time division duplex (TDD) mode.

When in a time plan such as the one illustrated in FIG. 8, a slot 802 is defined by an OFDM time symbol number and a subchannel logical number. A slot is the minimum possible data allocation unit, and its size may vary for uplink and downlink, for full used subchannelization (FUSC) and partially used subchannelization (PUSC), and for the distributed subcarrier permutations and the adjacent subcarrier permutation, between one subchannel by one OFDMA symbol (DL FUSC), one subchannel by two OFDMA symbols (DL PUSC), one subchannel by three OFDMA symbols (UL PUSC) to one subchannel by six OFDMA symbols (MIMO optional PUSC). For example, in DL and UL PUSC which will be discussed below, the DL and UL subframe size and the granularity of the DL and UL allocations are one by two or one by three OFDM symbols, respectively.

In OFDMA, a data region is a two-dimensional allocation of a group of contiguous subchannels, in a group of contiguous OFDMA symbols. Examples of data regions are shown in FIG. 8.

The DL-MAP message, if transmitted in the current frame, is the first MAC PDU in the burst following the FCH. An UL-MAP message follows immediately either the DL-MAP message (if one is transmitted) or the DLFP. If Uplink Channel Descriptor (UCD) and Downlink Channel Descriptor (DCD) messages are transmitted in the frame, they follow immediately the DL-MAP and UL-MAP messages.

Simultaneous DL allocations can be broadcast, multicast, and unicast and they can also include an allocation for another base station rather than a serving base station. Simultaneous ULs can be data allocations and ranging or bandwidth requests.

There are two major subchannel allocation methods in the downlink: partial usage of subchannels (PUSC) where some of the subchannels are allocated to the transmitter, and full usage of the subchannels (FUSC) where all subchannels are allocated to the transmitter. In FUSC, there is one set of common pilot subcarriers, but in PUSC, each subchannel contains its own set of pilot subcarriers. In other words, for PUSC in the downlink or in the uplink, the set of used subcarriers is first partitioned into subchannels, and then the pilot subcarriers are allocated from within each subchannel.

There are two main types of subcarrier permutations: distributed and adjacent. In general, distributed subcarrier permutations perform well in mobile applications while adjacent subcarrier permutations can be properly used for fixed, portable, or low mobility environments.

For FUSC in the downlink 810, the pilot tones are allocated first; then the zero carriers, then all the remaining subcarriers are used as data subcarriers, which are divided into subchannels that are used exclusively for data. There are two variable pilot-sets and two constant pilot-sets. In FUSC, each segment uses both sets of variable/constant pilot-sets.

Referring to FIG. 8, OFDMA DL subframes start in DL PUSC mode. In DL PUSC, subchannels may be divided and assigned to three segments that can be allocated to sectors of the same cell. A sector of a cell may be portioned through means known to a person skilled in the art, for example, through directional beam.

The available OFDMA subchannels may be divided into subsets for deploying a single instance of the MAC, the subset is called a segment. A segment may include all available subchannels. In PUSC, for example, any segment has at least 12 subchannels. Therefore, a downlink may be divided into a three segments and a preamble structure which begins the transmission. The preamble subcarriers at the beginning of downlink may also be divided into three carrier-sets, each of them may be used by one of the segments in the following manner: segment 0 uses preamble carrier-set 0; segment 1 uses preamble carrier-set 1; and segment 2 uses preamble carrier-set 2.

Permutation zone is a number of contiguous OFDMA symbols, in the DL or the UL, that use the same permutation formula. The DL subframe or the UL subframe may contain more than one permutation zone. An OFDMA frame may include multiple zones. Although the zones are sometimes shown as vertical columns spanning all the subchannel logical numbers, it should be apparent to a person skilled in the art that a permutation zone may also have other irregular shapes on a TDD time plan such as the one illustrated in FIG. 8.

Figure 9:
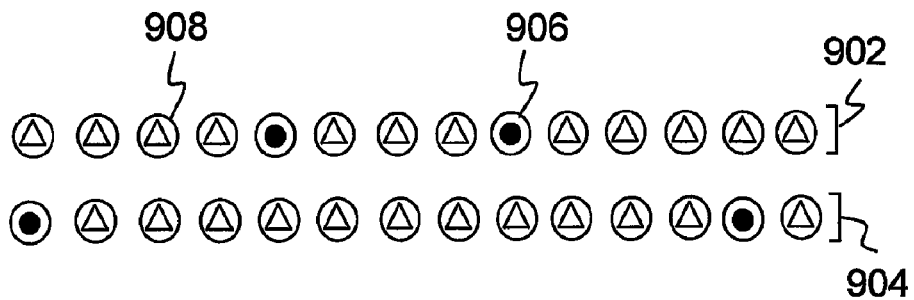
FIG. 9 (*a*) shows an example of a cluster.
Figure 9:
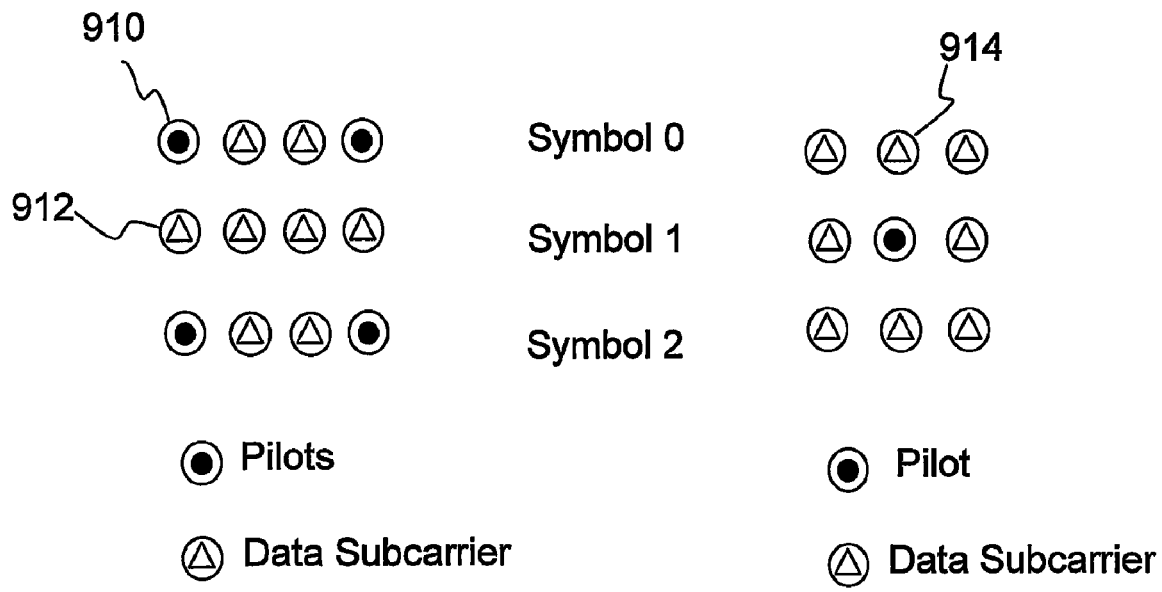

In a downlink PUSC, a symbol is first divided into basic clusters as illustrated in FIG. 9(*a*). Pilots 906 and data carriers 908 are allocated within each cluster 902, 904. For an OFDM symbol of FFT size 2048, the number of used subcarriers, after subtracting the guard subcarriers (367), is 1681. Each cluster may have 14 subcarriers for a total of 120 clusters.

Referring to FIG. 9(*b*) where an uplink PUSC tile structure is shown, for an OFDM symbol with FFT size 2048, a transmission in the uplink may be composed of three PUSC symbols. Each subchannel in uplink PUSC is constructed from six tiles. Each tile has four sub-carriers crossing three symbols. Within each transmission, there are 48 data subcarriers and 24 fixed-location pilot subcarrier. FIG. 9(*b*) shows the structure of a tile with data subcarrier 912 and pilot subcarrier 910.

FIG. 9(*c*) shows a tile in an uplink optional PUSC where a subchannel consists of 48 data carriers and six pilot carriers. An uplink subchannel is constructed from six uplink tiles, with each tile having three subcarriers 914 crossing three symbols.

Closed-loop transmission strategies use, for example, knowledge of the channel at the transmitter to improve link performance, reliability, and range. This methodology also provides a means for the base station to determine the quality of the channel response across the signal bandwidth for the purpose of selecting the best portion of the band on which to transmit.

Uplink channel sounding is a signaling mechanism to support the closed-loop transmission, where a subscriber station transmits channel sounding waveforms on the uplink to enable the base station to determine the base station to subscriber station channel response under the assumption of reciprocity. Uplink channel sounding also provides a means for the base station to determine the quality of the channel response across the signal bandwidth for the purpose of selecting the best portion of the band on which to transmit.

Channel sounding is mainly used in channel state information at the transmitter (CSIT) capable subscriber stations. Channel sounding further enables the base station to measure the uplink channel response and translate the measured uplink channel response to an estimated downlink channel response when the transmit and receive hardware are appropriately calibrated.

A dedicated channel resource, the sounding zone, may be allocated to enable uplink channel sounding. The sounding zone is a region of one or more OFDMA symbol intervals in the UL frame, preferably at the end of UL, that is used by the subscriber station to transmit sounding signals to enable the base station to rapidly determine the channel response between the base station and the subscriber station. The base station may command a subscriber station to transmit a sounding signal at one or more OFDMA symbols within the sounding zone by providing detailed sounding instructions to the subscriber station. With appropriately calibrated transmit and receive hardware at the base station, the base station can then translate the estimated UL channel response into an estimated DL channel response. The sounding instructions enable the subscriber station to determine where in the sounding zone it should transmit and the specific sounding waveform that should be used. The sounding waveforms used by the subscriber stations in the sounding zone are specifically designed to facilitate accurate UL channel estimation by the base station.

A first sounding type, sounding type A instructs the subscriber station to transmit specific sounding signals at one or more specific symbol intervals within the sounding zone and specifies the specific sounding frequency bands to be occupied within each of these sounding symbols. Sounding type A does not user subcarrier permutation on the down link. A second sounding type, sounding type B is similar to the sounding type A except the frequency bands are allocated according to a specified downlink subcarrier permutation.

For sounding type A, the OFDMA frequency bandwidth within the sounding zone may be partitioned into non-overlapping sounding frequency bands, where each sounding frequency band may contain 18 consecutive OFDMA subcarriers. For the 2048 FFT size, the sounding zone therefore may contain maximum of 1728/18=96 sounding frequency bands, where 1728 is the number of usable subcarriers ($N_{used}$). For other FFT sizes, the sounding bands may also be 18 subcarriers wide, and the number of possible sounding bands across the signal bandwidth varies accordingly. Additionally, for sounding type A, two alternate methods of maintaining signal orthogonality between multiple multiplexed subscriber station sounding transmissions may be used: "cyclic shift separability" involves the subscriber station occupying all subcarriers within the sounding allocation. Multiple subscriber stations use the same sounding sequence, but different frequency-domain phase shifts to multiply the underlying sounding sequence. In the second methodology, the subscriber station occupies a decimated set of subcarriers (e.g. every $16^{th}$ subcarrier, etc.). Multiple subscriber stations can occupy the same sounding allocation, but each subscriber station would use a set of non-overlapping subcarriers within the sounding allocation.

The introduction of sounding zone uses valuable resources in the UL frame. Since all CSIT capable subscriber stations need to perform channel sounding, a significant overhead is introduced. At the same time, active subscriber stations may send channel quality indication messages in a dedicated quality indication channel, such as the Channel Quality Indication Channel (CQICH) as defined in IEEE802.16-2004, to base station. In accordance with one embodiment of the present invention, the channel quality indication messages may be reused for the purpose of uplink channel sounding, in particular, in TDD system. The reuse of the channel quality indication messages may substitute, or complement the existing sounding zone. However, in order to obtain the channel response over the entire frequency band, sufficient sampling density crossing the entire band is required.

The quality indication channel may have six tiles in each channel. To cover the whole band, uplink channel sounding needs be based on a number of quality indication channels from the same subscriber station. As a result, excessive time may be required to complete the sounding. This problem may be even more evident in MIMO systems.

One embodiment of the present invention uses a modified quality indication channel. With this new modified quality indication channel, both quality indication channel and UL sounding channel are combined into an integrated solution, resulting in an expedited uplink channel sounding procedure.

Figure 10:
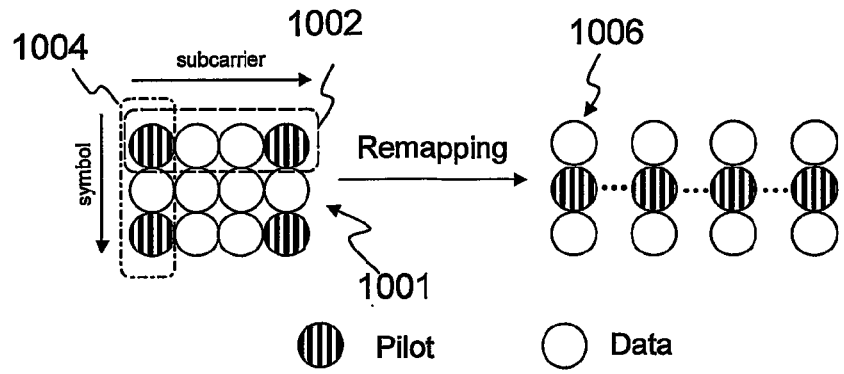
FIG. 10 (*a*) shows an example of a modified quality indication channel for PUSC.
Figure 10:
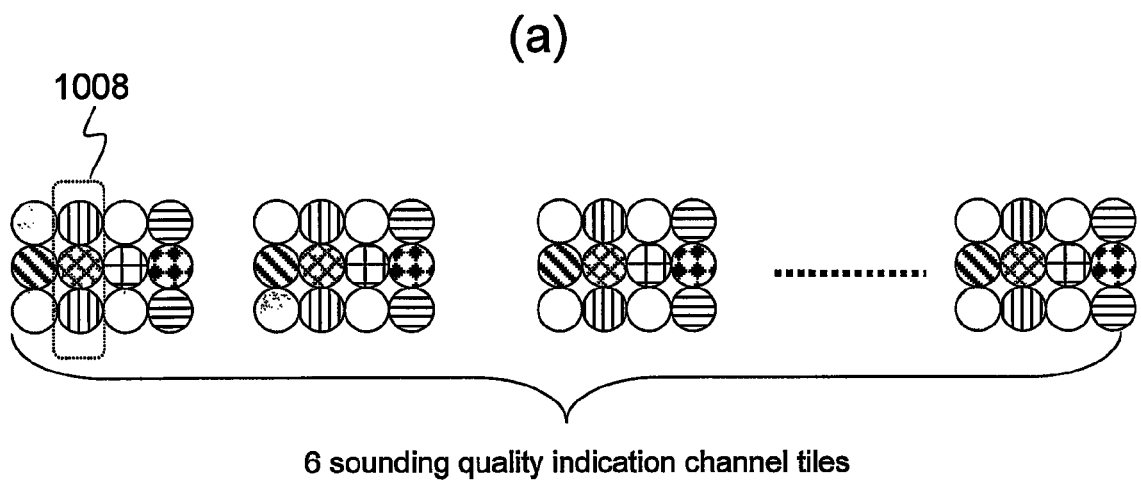
Figure 10:
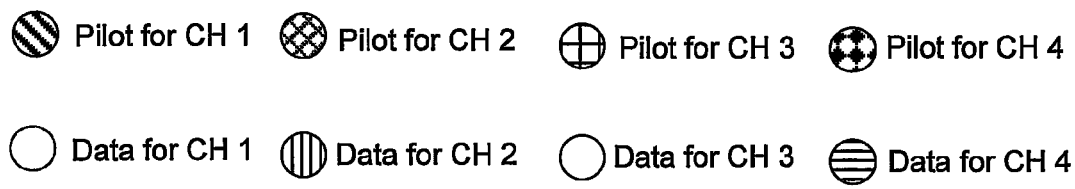

Referring to FIG. 10 (a) where an example of a modified quality indication channel for PUSC in accordance with one embodiment of the present invention is shown, one UL subchannel is constructed from six UL tiles, and each tile (1001) has four sub-carriers (1002) crossing three OFDM symbols (1004). To generate the modified quality indication channel, each UL tile is mapped into four mini-tiles (1006) and each mini-tile consists of one sub-carrier over three OFDM symbols. Four modified quality indication channels are generated by concatenating four UL subchannels. FIG. 10 (b) shows that each modified quality indication channel in this example is composed of 24 mini-tiles (1008), with each mini-tile selected from each of the tiles. In total, 24 (4×6) tiles and 96 (4×24) mini-tiles facilitate more accurate sub-band channel measurement, and provide enough sampling density across the whole band. At the same time the overhead is reduced due to the reuse and combination of the quality indication channel and UL sounding channel.

Figure 11:
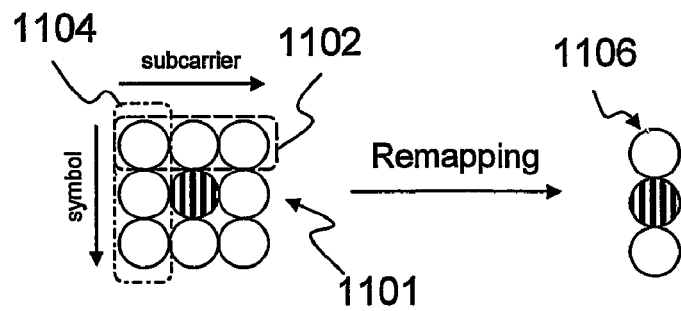
FIG. 11 (*a*) shows another example of a modified quality indication channel for optional PUSC.
Figure 11:
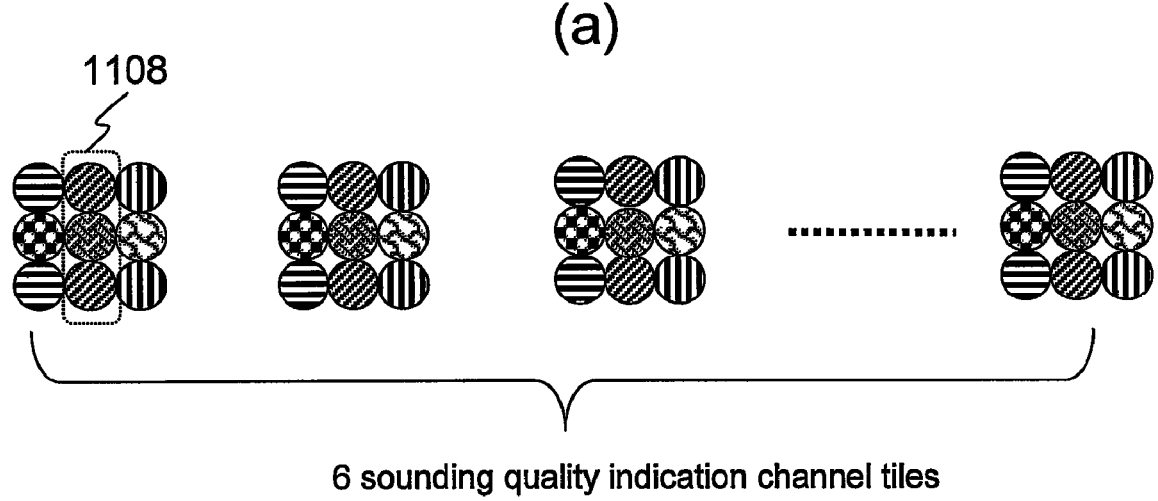

Referring to FIG. 11 (a) where another example of a modified quality indication channel for optional PUSC in accordance with one embodiment of the present invention is shown, one UL optional PUSC subchannel is constructed from six UL tiles, and each tile (1101) has three sub-carriers (1102) crossing three symbols (1104). To generate the modified quality indication channel, each UL tile is partitioned into three mini-tiles and each mini-tile (1108) consists of one sub-carrier over three OFDM symbols. Three modified quality indication channel channels are generated by concatenating four UL subchannels. As in PUSC, FIG. 11 (b) indicates that each modified quality indication channel is composed of 24 mini-tiles (1108) from 24 tiles.

Figure 12:
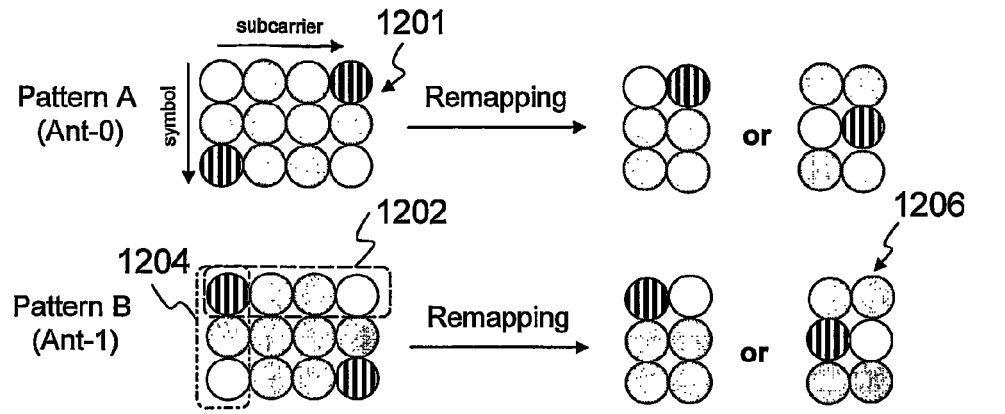
FIG. 12 (*a*) shows an example of a modified quality indication channel in MIMO system for PUSC.
Figure 12:
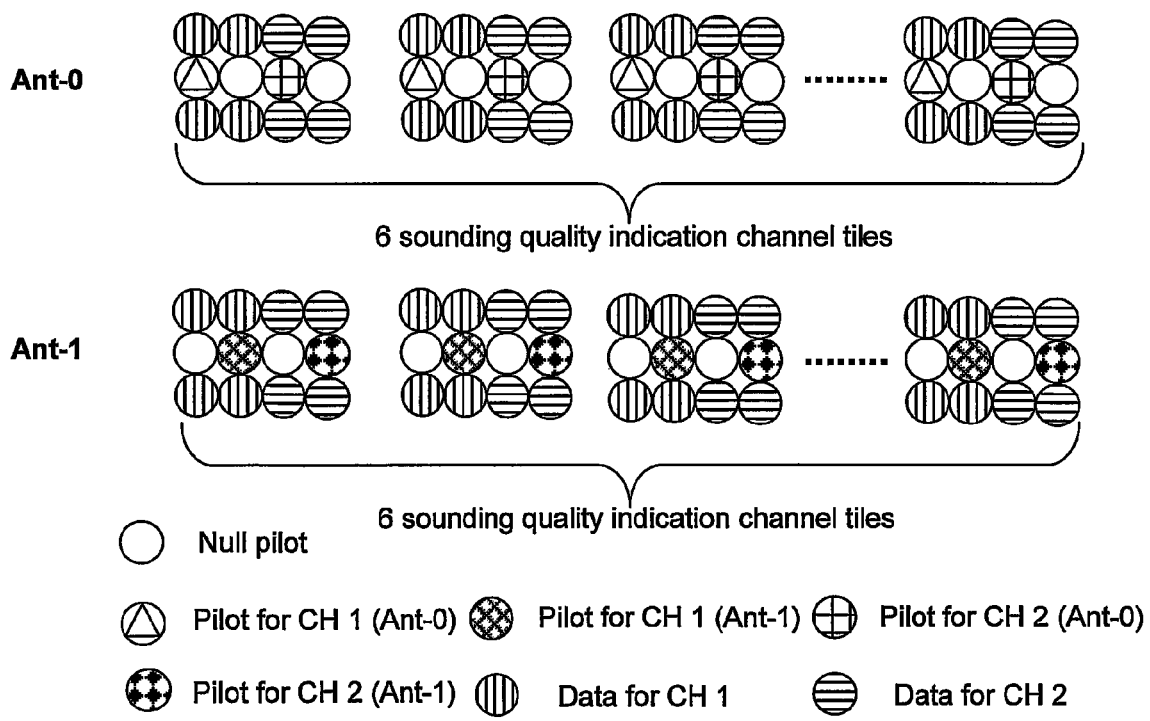

FIG. 12 (a) shows an example of a modified quality indication channel in MIMO system for PUSC. The MIMO UL subchannel is constructed from six MIMO UL tiles, and each MIMO UL tile (1201) has four sub-carriers crossing three symbols. To generate MIMO modified quality indication channel, each UL tile is partitioned into 2 mini-tiles (1206). Each mini-tile comprises 2 sub-carriers (1202) over three OFDM symbols (1204). Two MIMO modified quality indication channel channels (CQICH 1 and CQICH 2) are generated by concatenating 2 MIMO UL subchannels. Each MIMO modified quality indication channel is composed of 12 mini-tiles from 12 tiles. Antenna 0 (Ant-0) and antenna 1 (Ant-1) use different pilot pattern (pattern A and B).

FIG. 12 (b) shows the construction of MIMO modified quality indication channel and the data mapping strategy for two antennas (Ant-0 and Ant-1). For uplink MIMO capable subscriber station using 2 antennas can be applied in the transmission of modified quality indication channel channel.

Figure 13:
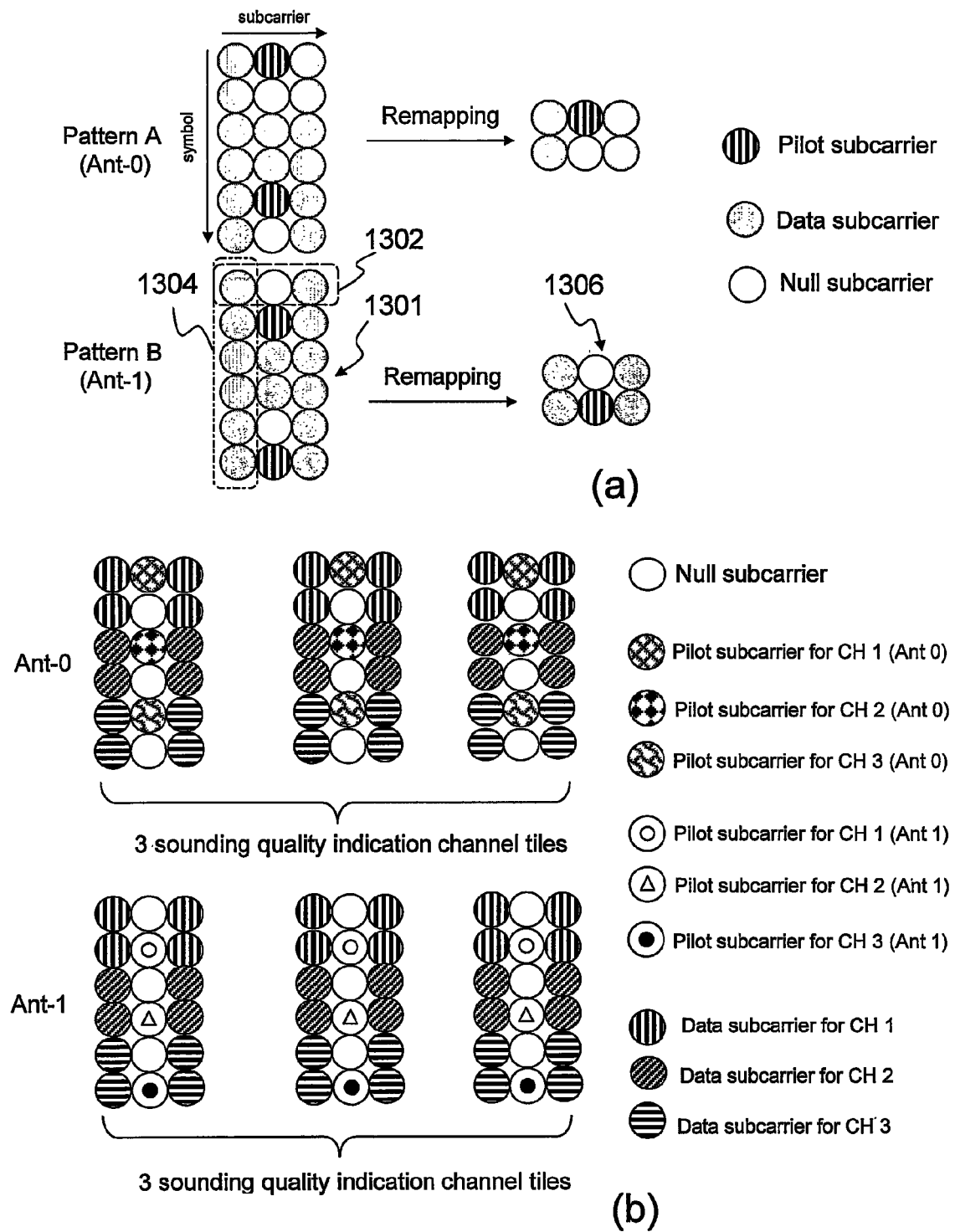
FIG. 13 (*a*) shows an example of a modified quality indication channel in MIMO system for optional PUSC.

FIG. 13 (a) shows an example of a modified quality indication channel in MIMO system for optional PUSC. One MIMO UL subchannel is constructed from three MIMO UL tiles, and each MIMO tile (1301) has three subcarriers (1302) crossing six symbols (1304). To generate MIMO modified quality indication channel, each UL tile is re-mapped into three mini-tiles. Each mini-tile comprises three sub-carriers over 2 OFDM symbols. Three MIMO modified quality indication channel channels are constructed by concatenating four MIMO UL subchannels. Each MIMO modified quality indication channel is composed of six mini-tiles from six tiles. As shown in FIG. 13 (b), two antennas (Ant-0, Ant-1) may use different pilot pattern.

In the above examples of the present invention, the base stations exploit reciprocity to obtain the DL channel state information from pilots received over the UL channel in time-division duplex (TDD) systems, where the base station and subscriber station share the same frequency band for transmission. In broadband wireless networks with frequency-division duplex (FDD), where the base station transmits and receives on different frequencies, this assumption of reciprocity may not apply.

In accordance with another embodiment of the present invention, there is provided a round trip pilot relay channel sounding method and system for estimating the wide band channel response in FDD operation, as well as in TDD operation including situations where base station transceiver calibration is not implemented by providing DL channel state information to the base station.

Figure 14:
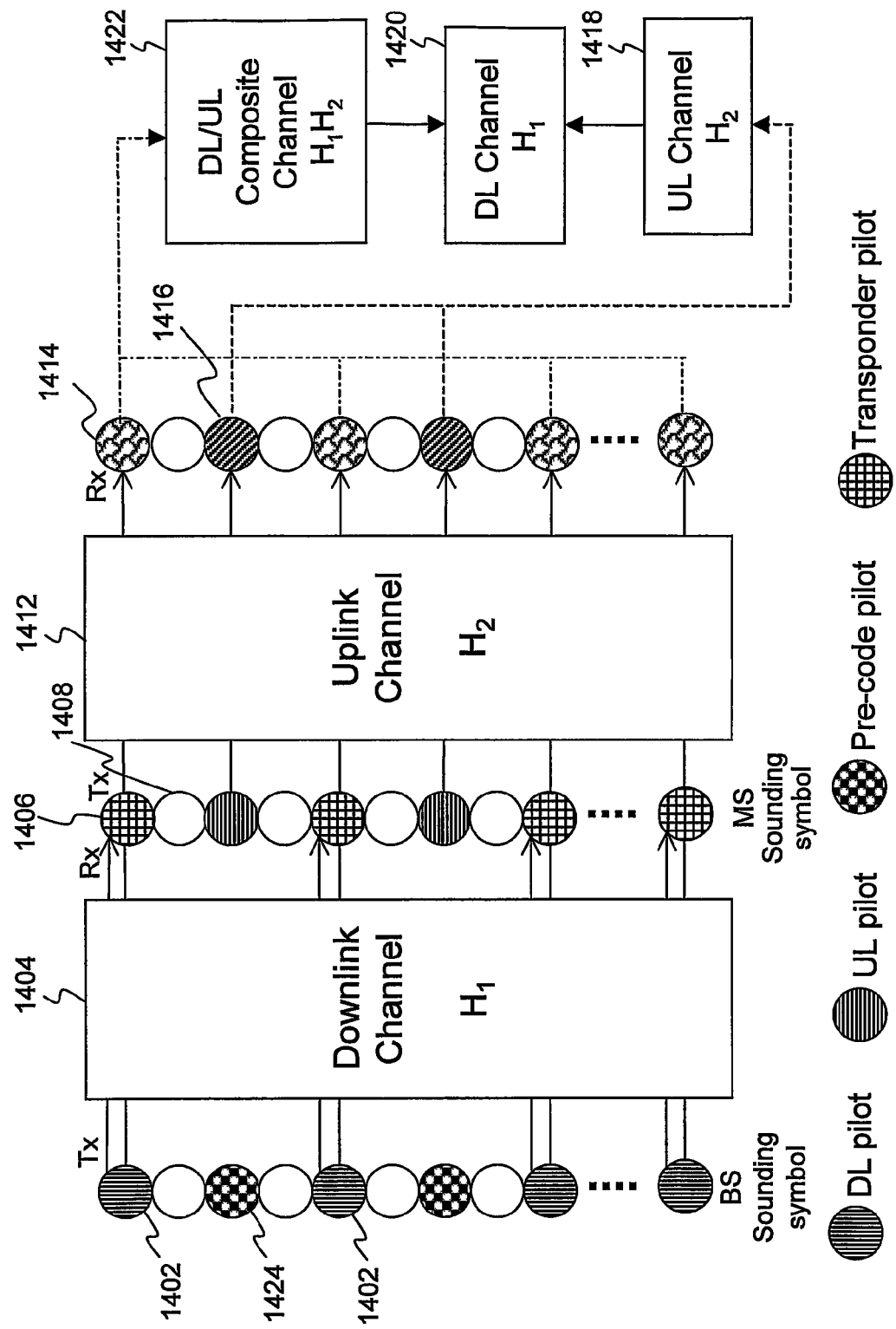
FIG. 14 shows a single-input, single-output (SISO) example for round trip pilot relay channel sounding.

FIG. 14 shows a single-input, single-output example where the existing DL and UL pilot constructs are reused in a more efficient fashion for uplink channel sounding. Referring to FIG. 14, the DL sounding pilots 1402, which are decimated in frequency domain, are sent over the downlink channel 1404 and received by the subscriber station. The subscriber station applies the received DL pilot as UL sounding symbol, in other words, subscriber station sends a transponder pilot 1406 which corresponds to the DL channel response between the base station and the subscriber station. In addition, the subscriber station also transmits the UL pilot 1408. After transmission over the UL channel 1408, base station uses the resulting transponder pilot 1414 and the resulting UL pilot 1416 to estimate the UL channel 1418, the composite DL/UL channel 1422 and the DL channel 1420. After estimating the DL channel through the round trip pilot relay channel sounding, the base station may pre-code the DL pilot 1424, thus eliminating subsequently the requirement for transmitting pre-coded matrix from subscriber station to base station, or from base station to subscriber station. DL pilot 1402 may also be mid-ambles. The mid-ambles in an OFDMA system has been described in PCT Application PCT/CA2005/00987, filed on Jun. 23, 2005, which is incorporated by reference in its entirety.

Figure 15:
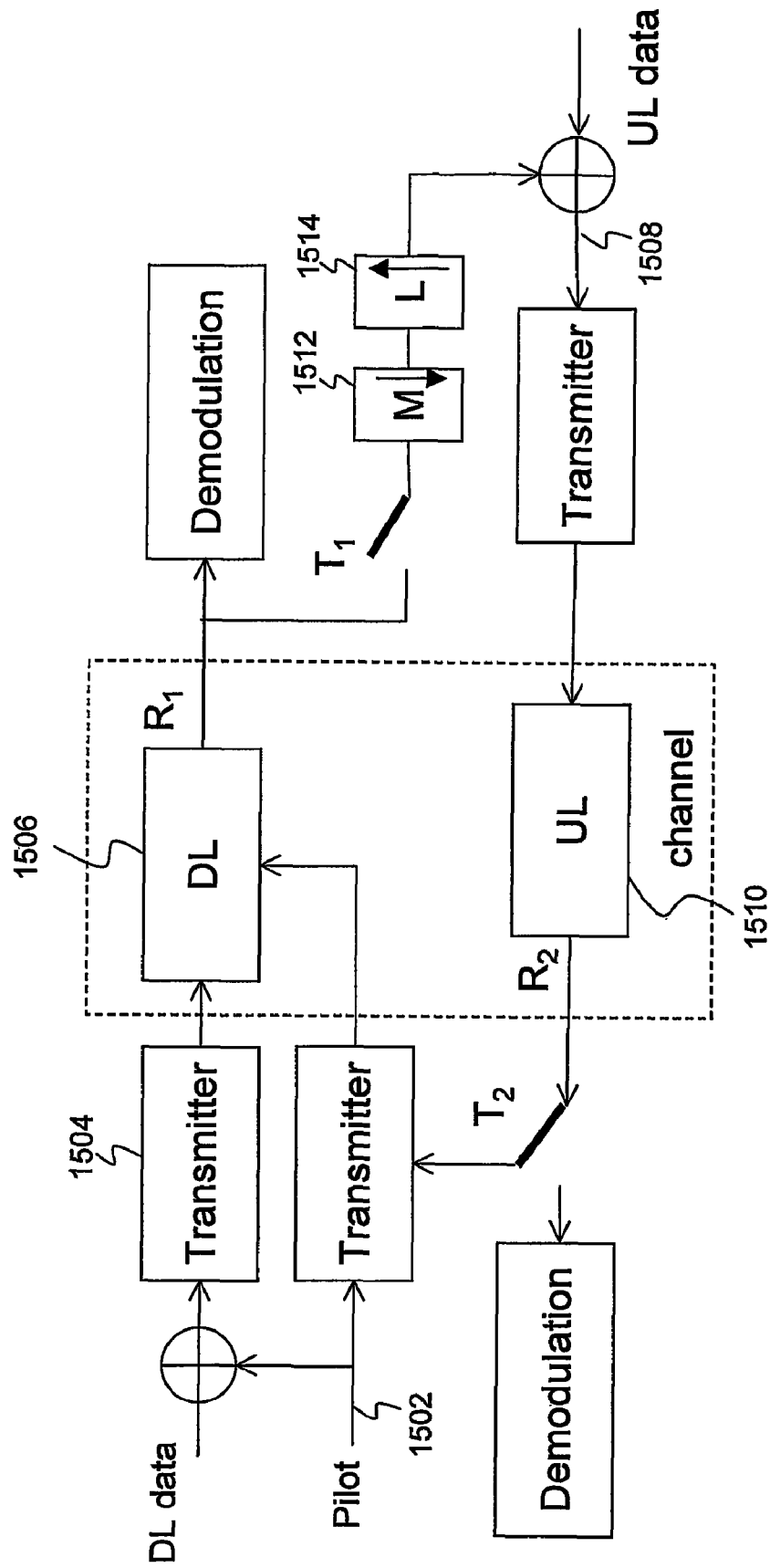
FIG. 15 shows the general principle of round trip pilot relay channel sounding.

FIG. 15 shows the general principle of round trip pilot relay channel sounding in accordance with the present invention. A DL pilot 1502 is sent by a transmitter 1504 at a base station, the DL pilot is received by the subscriber station after passing through the DL channel 1506. Subscriber station then sends sounding symbol and inserts transponder pilot sample 1508 received from DL channel, possibly after down-sampling 1512 or up-sampling 1514, to extract the decimated DL pilot and transmit a subset of the received pilot values back to the base station. The transponder pilot is sent back to the base station through the UL channel 1510, enabling the base station to estimate both the DL and the UL channels and separate the DL and the UL channel responses.

Figure 16:
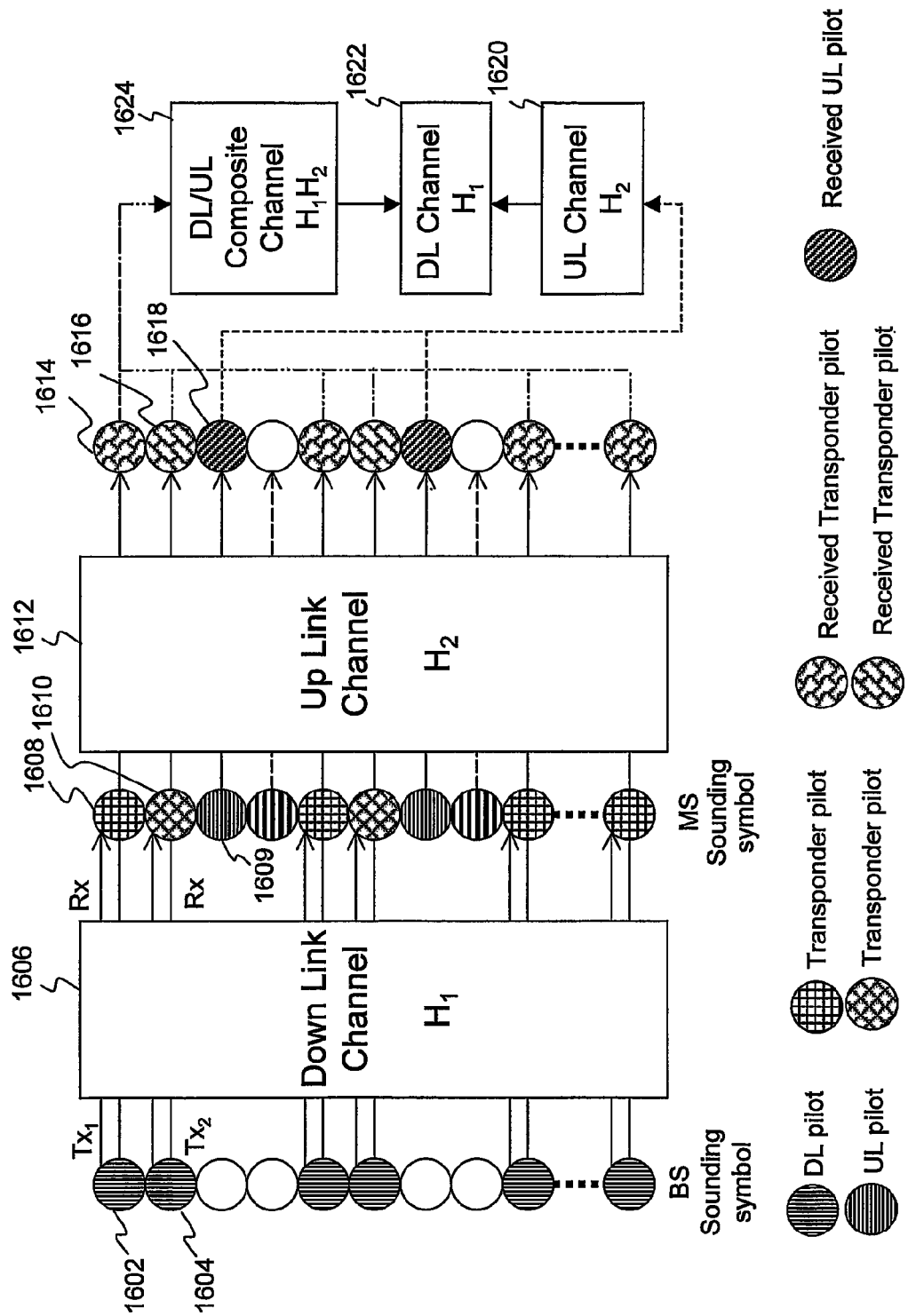
FIG. 16 shows a multiple-input, single-output (MISO) example for round trip pilot relay channel sounding.

FIG. 16 shows a multiple-input, single-output (MISO) example of one embodiment of the present invention. The term "input" and "output" are with reference to the transmission channels. Therefore, a single input usually indicates that a single transmit antenna at the base station is transmitting into a DL channel, while multiple-output means multiple receiving antennas at the subscriber station are receiving the outputs from the DL channel. In general, an M×N multiple-input, multiple-output (MIMO) system has M transmit antennas at the base station and N receive antennas at the subscriber station. However, it should be apparent to a person skilled in the art that the number of the receive antennas at the base station may or may not be equal to M. Similarly, the number of the transmit antennas may at the subscriber station may or may not be equal to N. In this example, there are two DL sounding pilots, one sounding pilot 1602 from transmit antenna 0 and the other sounding pilot 1604 from transmit antenna 1 of the base station, which may be decimated in frequency domain, are sent over the downlink channel 1606 and received by the single receive antenna of the subscriber station. The subscriber station applies the received DL pilot which has the information about the DL channel response between the base station and the subscriber station, as UL sounding symbol (a transponder pilot 1608, 1610). In addition, the subscriber station also transmits the UL pilot 1609. After transmission over the UL channel 1612, base station uses the resulting transponder pilot 1614, 1616 and the resulting UL pilot 1618 to estimate the UL channel 1620, DL channel 1622 and the composite DL/UL channel 1624.

Figure 17:
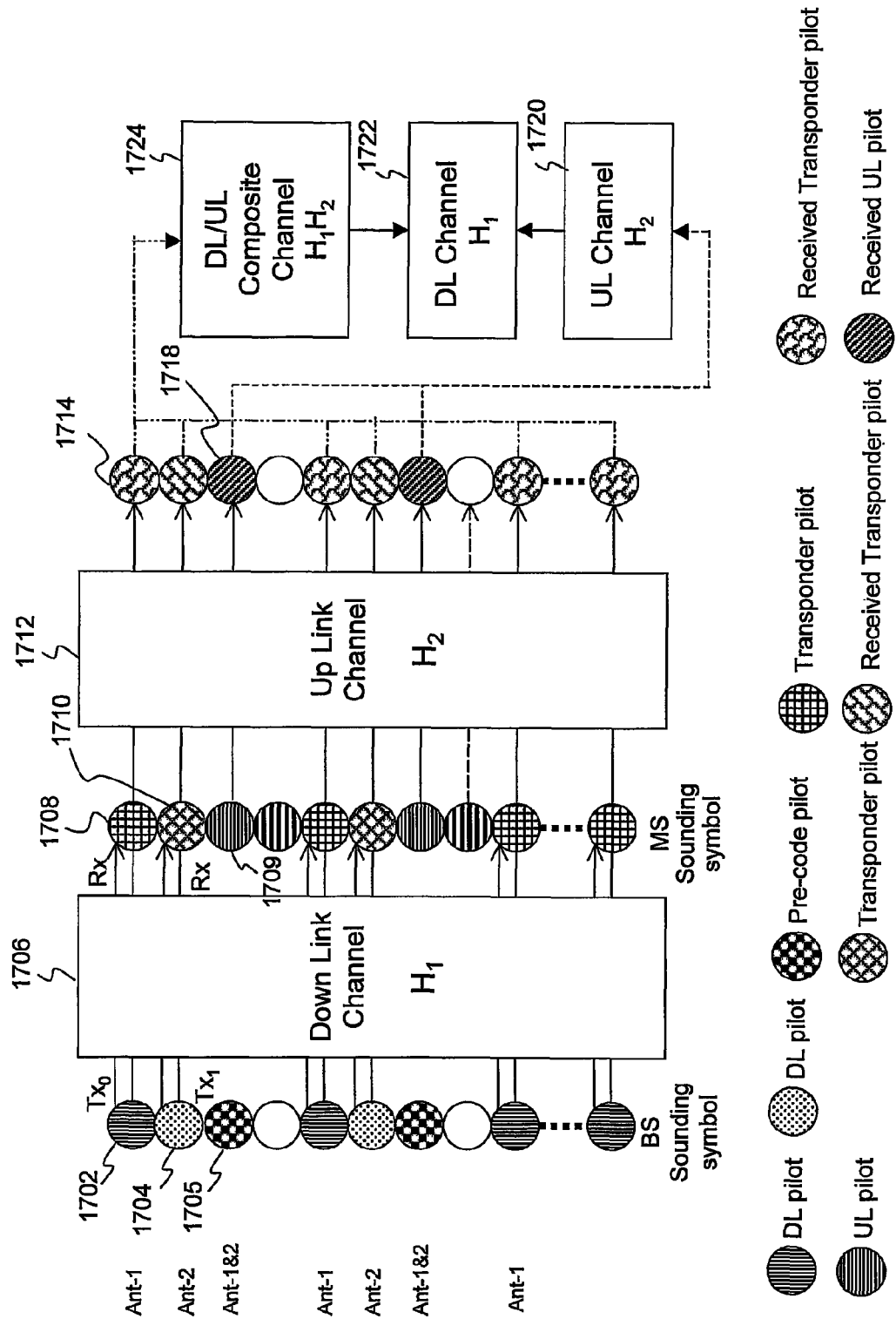
FIG. 17 shows another MISO example for round trip pilot relay channel sounding.

FIG. 17 is another example of a multiple-input, single-output (MISO) system in accordance with one embodiment of the present invention, where dedicated pilots are multiplexed into one DL sounding symbol for reception by the single output, i.e. the single receive antenna at the subscriber station. In this example, there are two DL sounding pilots, one sounding pilot 1702 from transmit antenna 0 ($Tx_0$) and the other sounding pilot 1704 from transmit antenna 1 ($Tx_1$) of the base station. The pilots, which may be decimated in frequency domain, are multiplexed and sent over the downlink channel 1706 and received by the single receive antenna (Rx) of the subscriber station. The subscriber station applies the received DL pilots, which pilots have the corresponding DL channel responses from $Tx_0$ to Rx and $Tx_1$ to Rx, respectively, as UL sounding symbols (transponder pilots 1708 1710). In addition, the subscriber station also transmits the UL pilot 1709. After transmission over the UL channel 1712, base station uses the resulting transponder pilots 1714, 1716 and the resulting UL pilot 1718 to estimate the UL channel 1720, DL channel 1722 and the composite DL/UL channel 1724. The base station may further transmit pre-coded pilot 1705.

Figure 18:
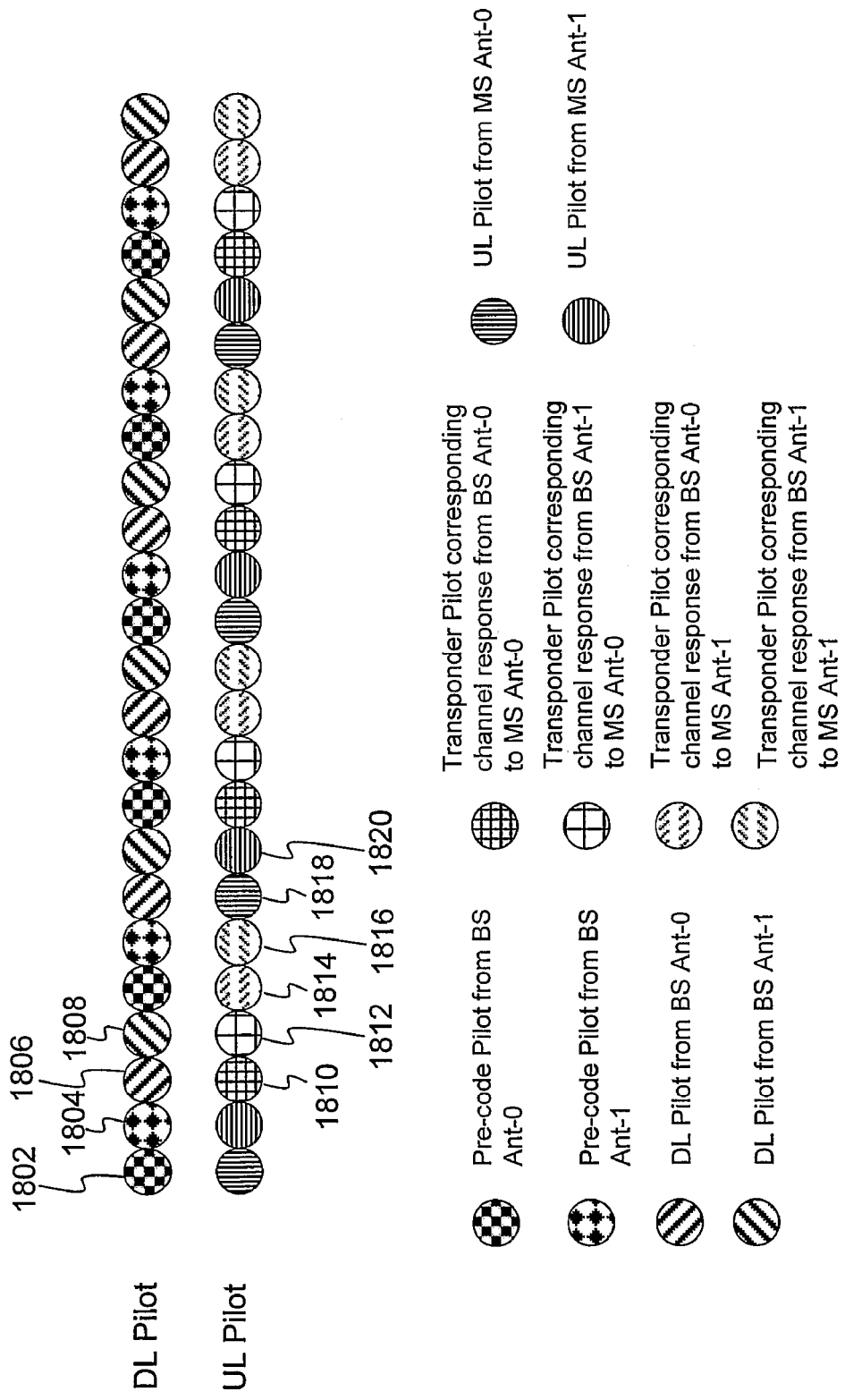
FIG. 18 shows a multi-input, multi-output (MIMO) example for round trip pilot relay channel sounding.

FIG. 18 shows an example with multi-input, multi-output (MIMO) where two transmit antennas at base station and two receive antennas at subscriber station (2×2) are used. In this example the DL pilots comprise alternating pre-code pilots 1802, 1804 and DL pilots 1806, 1808 for sounding between the base station and subscriber station. The subscriber station then sends the transponder pilots. For example, transponder pilot 1812 corresponds to the DL channel response from base station (BS) antenna 1 to subscriber station (MS) antenna 0. Each of the antennas of subscriber station also sends UL pilots 1818, 1820 to base station.

Figure 19:
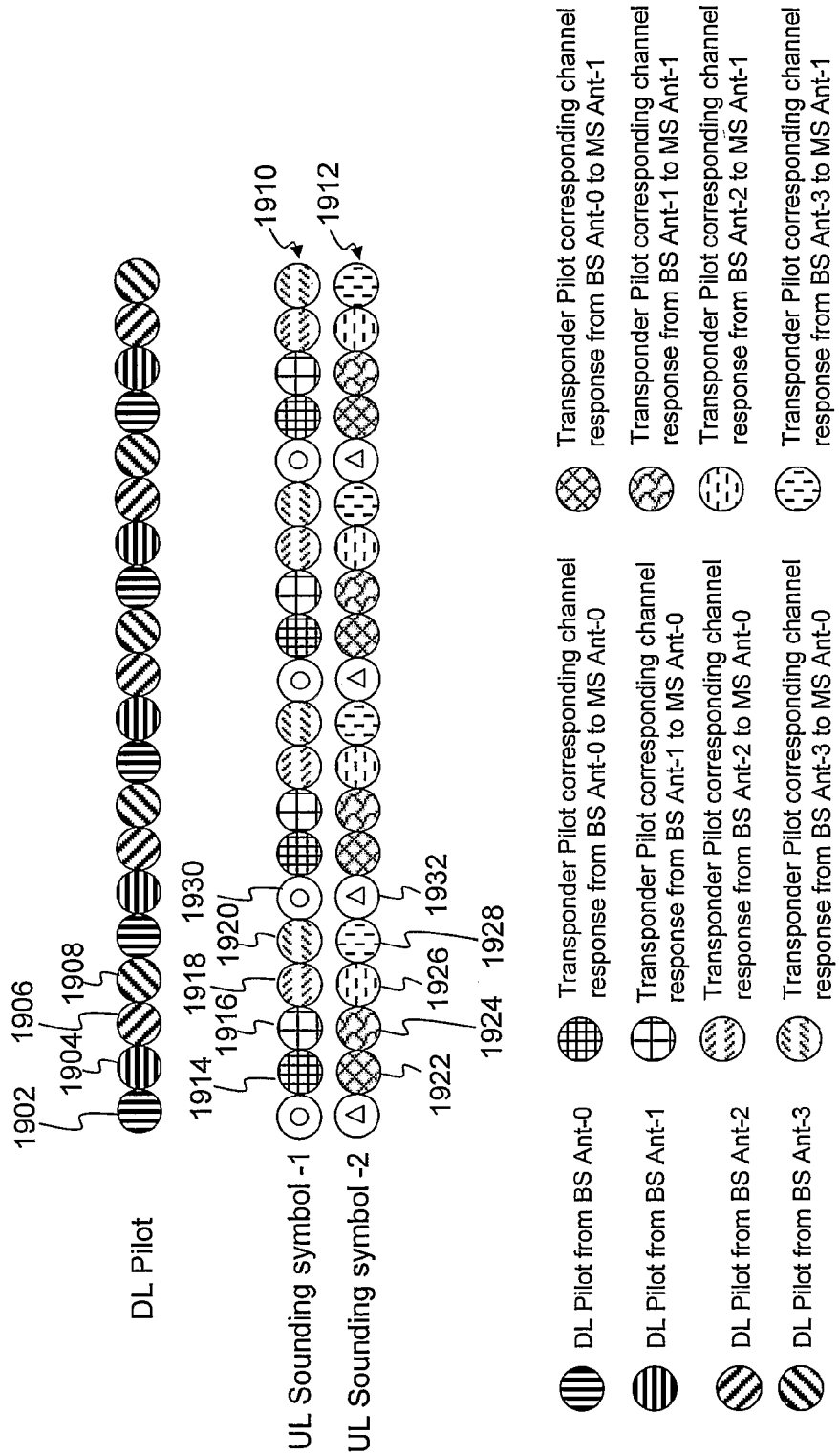
FIG. 19 shows a MIMO example with four inputs and two outputs (4×2) for round trip pilot relay channel sounding.

FIG. 19 shows an example with multi-input, multi-output (MIMO) Where four transmit antennas at base station and two receive antennas at subscriber station (4×2) are used. In this example the DL pilots comprise four DL pilots 1902, 1904, 1906, 1908 for each of the base station (BS) transmit antennas for sounding between the base station and subscriber station (MS). Two UL transponder sounding symbols are used: one 1910 used by subscriber station transmit antenna 0 and one 1912 used by subscriber station transmit antenna 1. Sounding symbol 1910 comprises the transponder pilots 1914, 1916, 1918, 1920, representing the channel responses from each of the four base station transmit antennas to the receive antenna 0 of the subscriber station, respectively. For example, transponder pilot 1918 corresponds to the UL channel response between the antenna 2 of the base station (BS) and the antenna 0 of the subscriber station (MS). Similarly, sounding symbol 1912 has the transponder pilots 1922, 1924, 1926, 1928, representing the channel response from each of the four transmit antennas of the base station to the subscriber station receive antenna 1, respectively. Each of the subscriber station antennas also sends UL pilots 1930, 1932 to base station.

Figure 20:
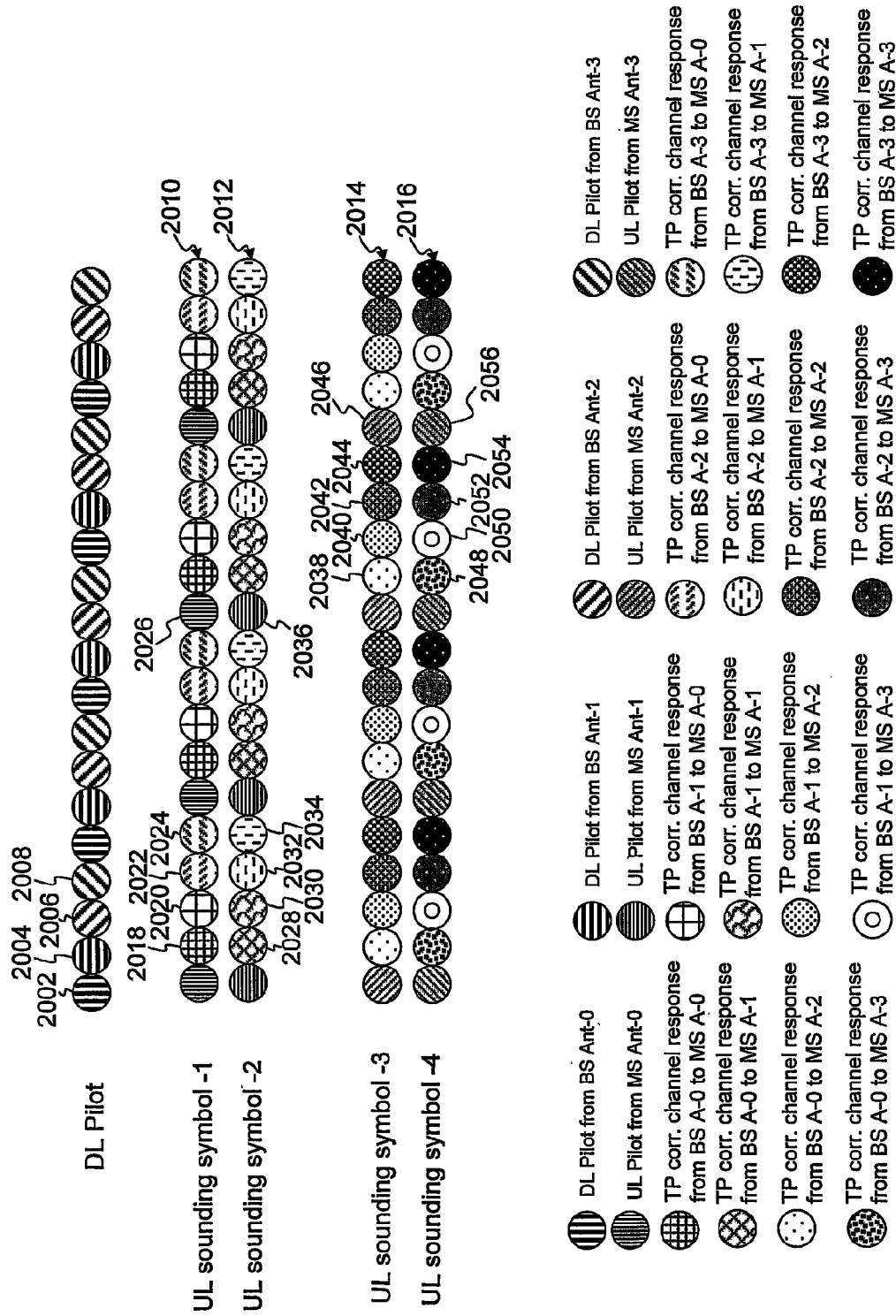
FIG. 20 shows a MIMO example with four inputs and four outputs (4×4) for round trip pilot relay channel sounding.

FIG. 20 shows an example with multi-input, multi-output (MIMO) where four transmit antennas at base station and four receive antennas at subscriber station (4×4) are used. The DL pilots comprise four DL pilot carriers 2002, 2004, 2006, 2008 for each of the base station antennas for sounding between the base station (BS) and subscriber station (MS). Four UL sounding symbols 2010, 2012, 2014, 2016 are used. Sounding symbol 2010 comprises the transponder pilots (TP) 2018, 2020, 2022, 2024 representing the channel responses from each of the four base station transmit antennas to the receive antenna 0 of the subscriber station, respectively, in addition to the UL pilot 2026. For example, transponder pilot 2020 corresponds to the UL channel response between the transmit antenna 1 of the base station and the receive antenna 0 of the subscriber station. Sounding symbol 2012 comprises the transponder pilots (TP) 2028, 2030, 2032, 2034 representing the channel responses from each of the four base station transmit antennas to the receive antenna 1 of the subscriber station to respectively, in addition to the UL pilot 2036. Sounding symbol 2014 comprises the transponder pilots (TP) 2038, 2040, 2042, 2044 representing the channel responses from each of the four base station transmit antennas to the receive antenna 2 of the subscriber station, respectively, in addition to the UL pilot 2046. Sounding symbol 2016 comprises the transponder pilots (TP) 2048, 2050, 2052, 2054 representing the channel responses from each of the four base station transmit antennas to the receive antenna 3 of the subscriber station to, respectively, in addition to the UL pilot 2056.

The DL pilot may be mid-ambles in the MIMO examples above. Furthermore, transponder pilots may be generated from a subset of DL pilots transmitted by the DL sounding symbol. In MIMO systems, frequency domain pilot arrangement for transponder pilot and UL pilot may be changed according to the corresponding antenna configurations of the base station and the subscriber station. The transponder pilot and UL sounding pilot may be transmitted by non-overlap subcarriers in the same OFDM symbols or different OFDM symbols.

Figure 21:
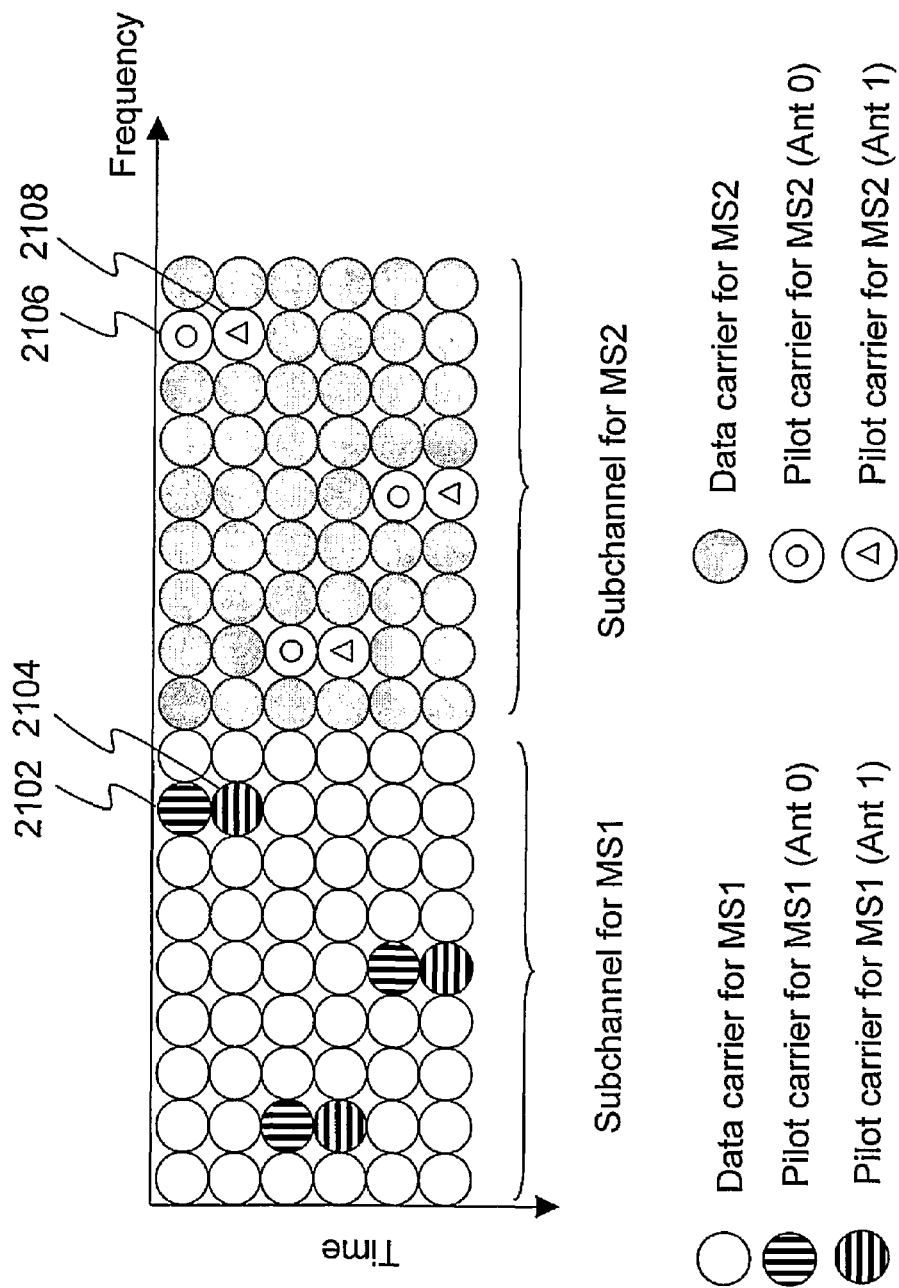
FIG. 21 shows an example of pre-coded pilots in a two antenna base station for an optional advanced modulation and coding (AMC) zone.

As illustrated for example in FIGS. 17 and 18, pilots dedicated to a specific subscriber station may be needed to allow subscriber station specific pre-coding to support some close-loop MIMO schemes. Although pilots are generally broadcast to and shared by all subscriber stations, FIG. 21 shows that pilots can be imbedded in the data carriers and dedicated to subscriber stations within each subchannel as explained here in an example of a two-antenna base station for an optional AMC zone. Pilot carriers 2102, 2104 are used for subscriber station antenna 0 and subscriber station antenna 1 within the subchannel for subscriber station 1, while pilot carriers 2106 and 2108 are used for subscriber station antenna 0 and subscriber station antenna 2 within the subchannel for subscriber station 2.

Figure 22:
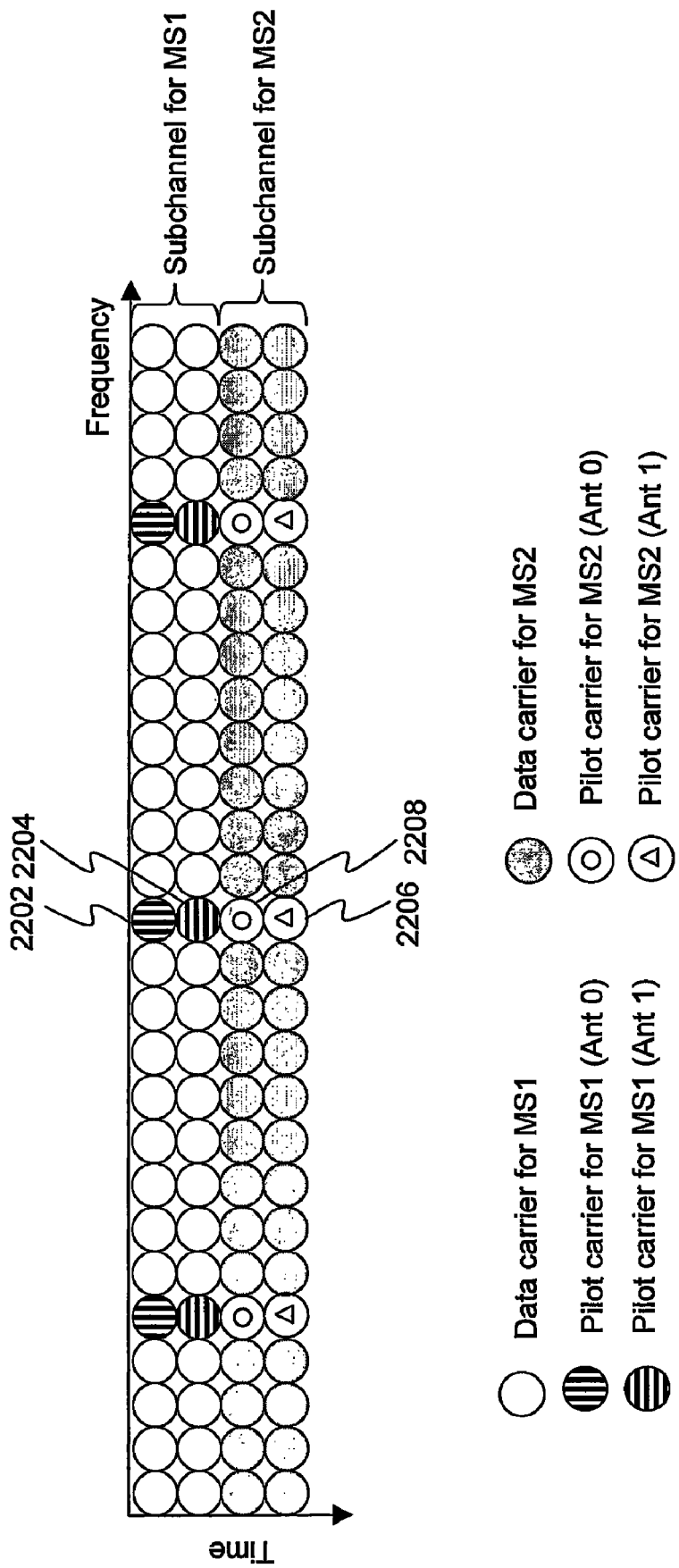
FIG. 22 shows an example of pre-coded pilots in a two-antenna base station for optional AMC zone.

FIG. 22 shows that pilots can be dedicated to subscriber stations within each subchannel in a two antenna base station for an optional AMC zone where the subchannels are divided in the time domain. Pilot carriers 2202, 2204 are used for subscriber station antenna 0 and subscriber station antenna 1 within the subchannel for subscriber station 1, while pilot carriers 2206, 2208 are used for subscriber station antenna 0 and subscriber station antenna 2 within the subchannel for subscriber station 2.

Figure 23:
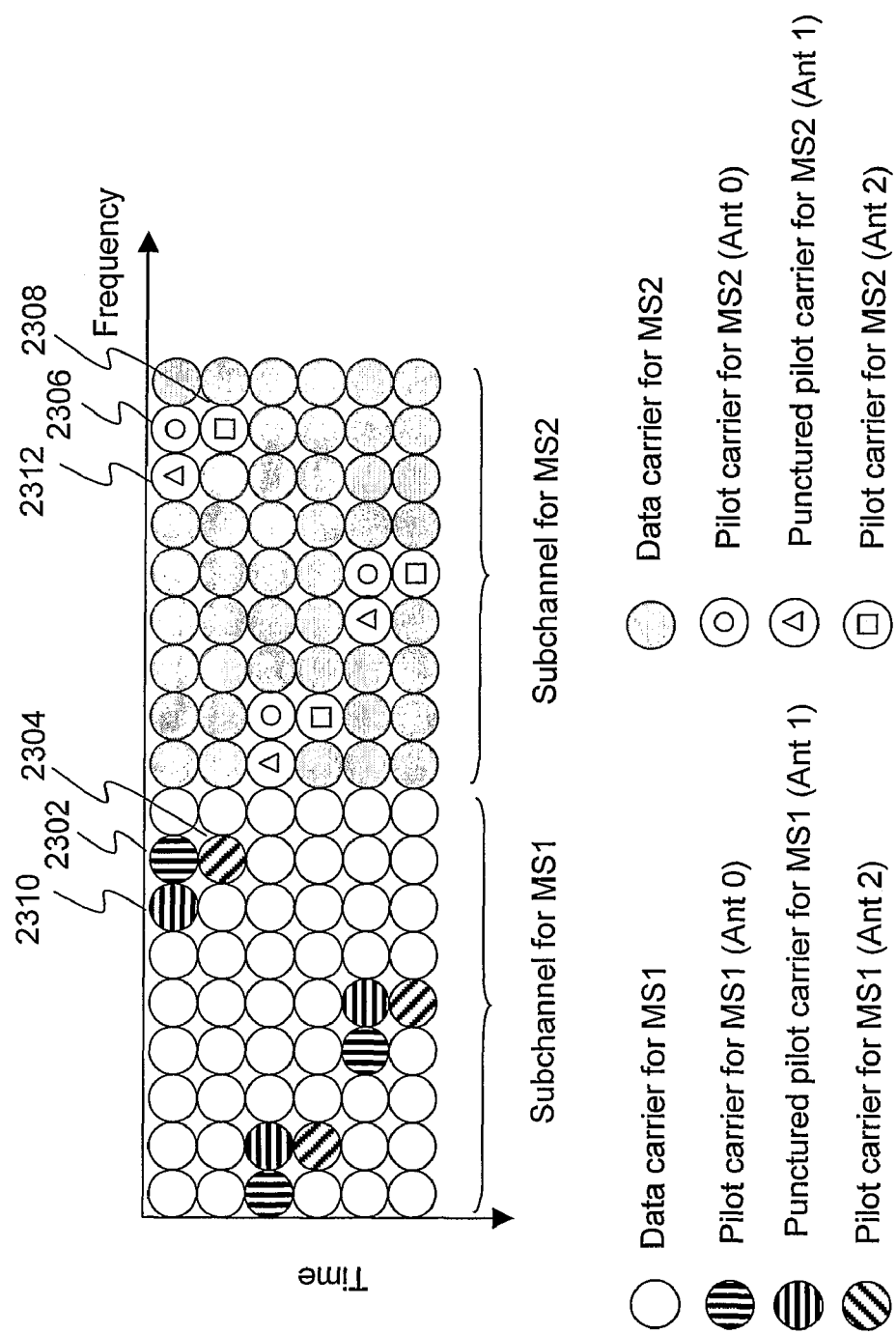
FIG. 23 shows an example of pre-code pilot for a three-antenna base station for optional AMC zone.

FIG. 23 shows an example of pre-code pilot for three-antenna base station for the optional AMC zone. Pilot carriers 2302, 2304 are used for subscriber station antenna 0 and subscriber station antenna 2 within the subchannel for subscriber station 1, while pilot carriers 2306 and 2308 are used for subscriber station antenna 0 and subscriber station antenna 2 within the subchannel for subscriber station 2. Since the number of transmitted data carrier may be fixed in the optional AMC zone, punctured pilots 2310, 2312 may be used in subchannels where otherwise the data carriers are present.

Figure 24:
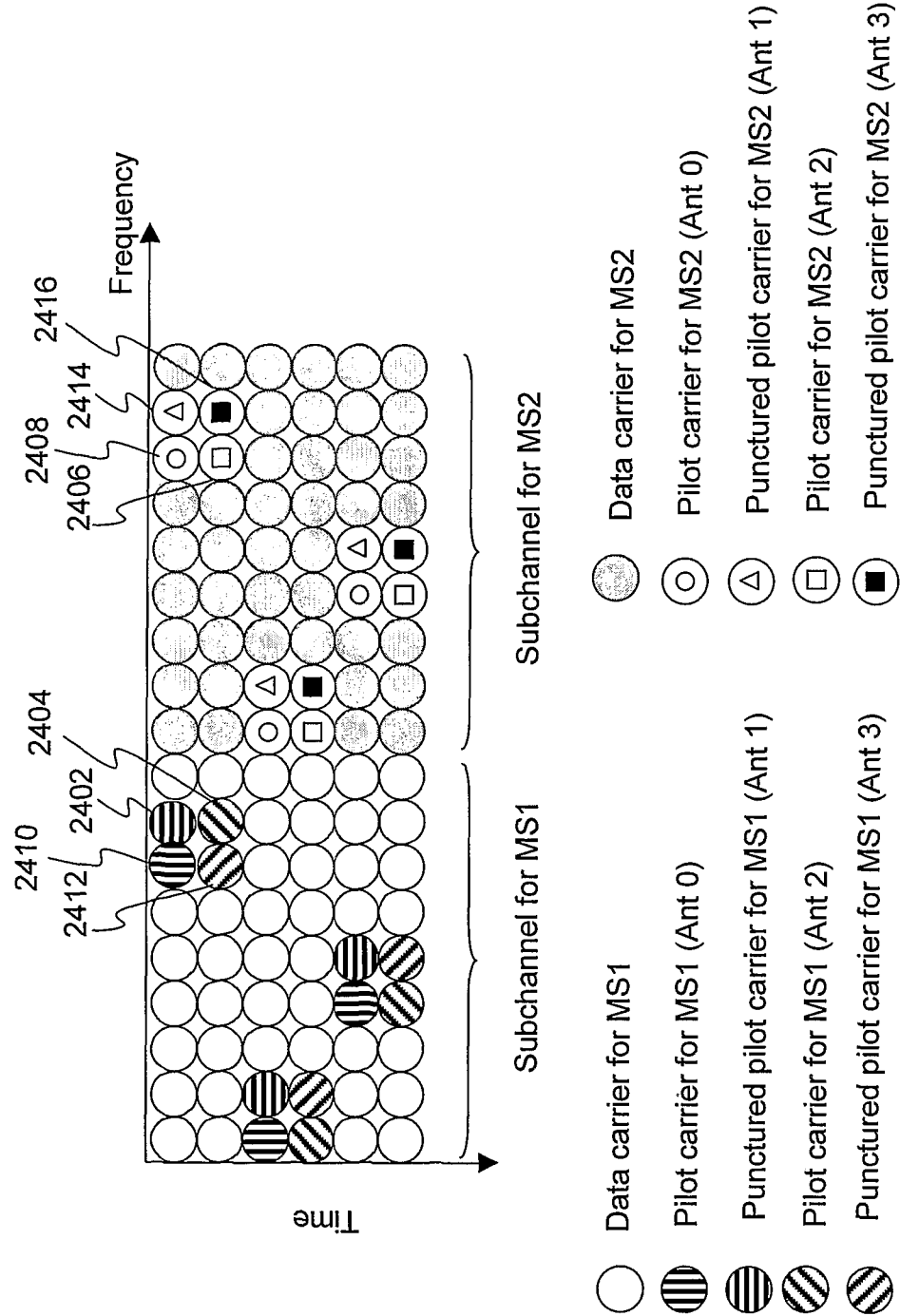
FIG. 24 shows an example of pre-code pilot for a four-antenna base station for optional AMC zone.

FIG. 24 shows another example of pre-code pilot for four-antenna base station for optional AMC zone. Pilot carriers 2402, 2404 are used for subscriber station antenna 0 and subscriber station antenna 2 within the subchannel for subscriber station 1, while pilot carriers 2406, 2408 are used for subscriber station antenna 0 and subscriber station antenna 2 within the subchannel for subscriber station 2. Punctured pilots 2410, 2412, 2414, 2416 may be used in subchannels where otherwise the data carriers are present.

Figure 25:
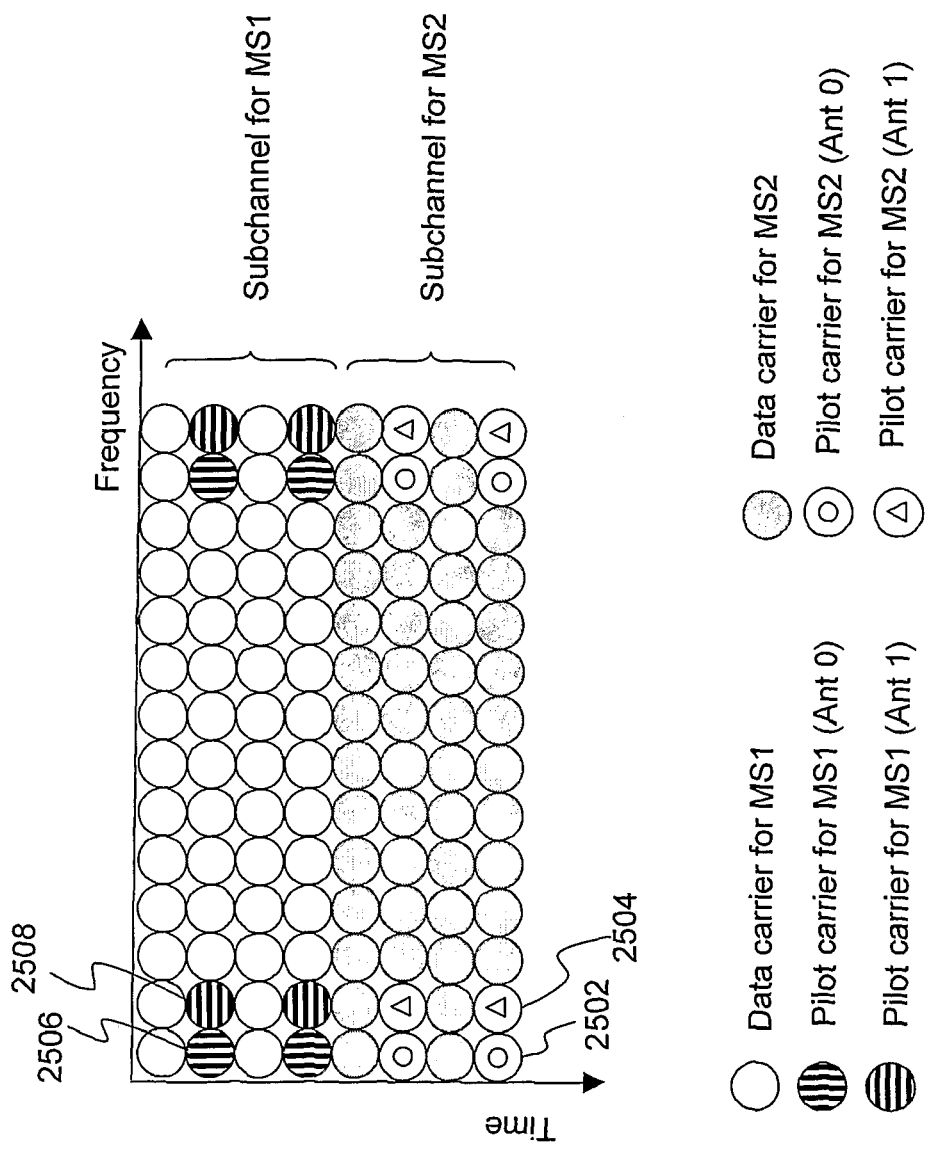
FIG. 25 shows an example of pre-code pilots for PUSC zone.

FIG. 25 shows an example of pre-code pilot for PUSC zone. In PUSC, an OFDMA symbol is first divided into clusters. Pilots and data carriers are allocated within each cluster. Allocation of the data carriers to subchannel is based on permutations. Hence, the data carriers in each cluster may be assigned to different subscriber stations, and the pilots are used by multiple subscriber stations.

To support the dedicated pilots to close-loop subscriber station operating in PUSC mode, permutation procedure to partition the sub-carriers into subchannels may be disabled so that each subchannel has 48 data carriers from two clusters.

In FIG. 25, where an example for PSUC is shown, each subchannel has dedicated pilots 2502, 2504, 2506, 2508 for each of the transmit antennas (Ant 0, Ant 1) of the subscriber stations MS1 and MS2, respectively.

Figure 26:
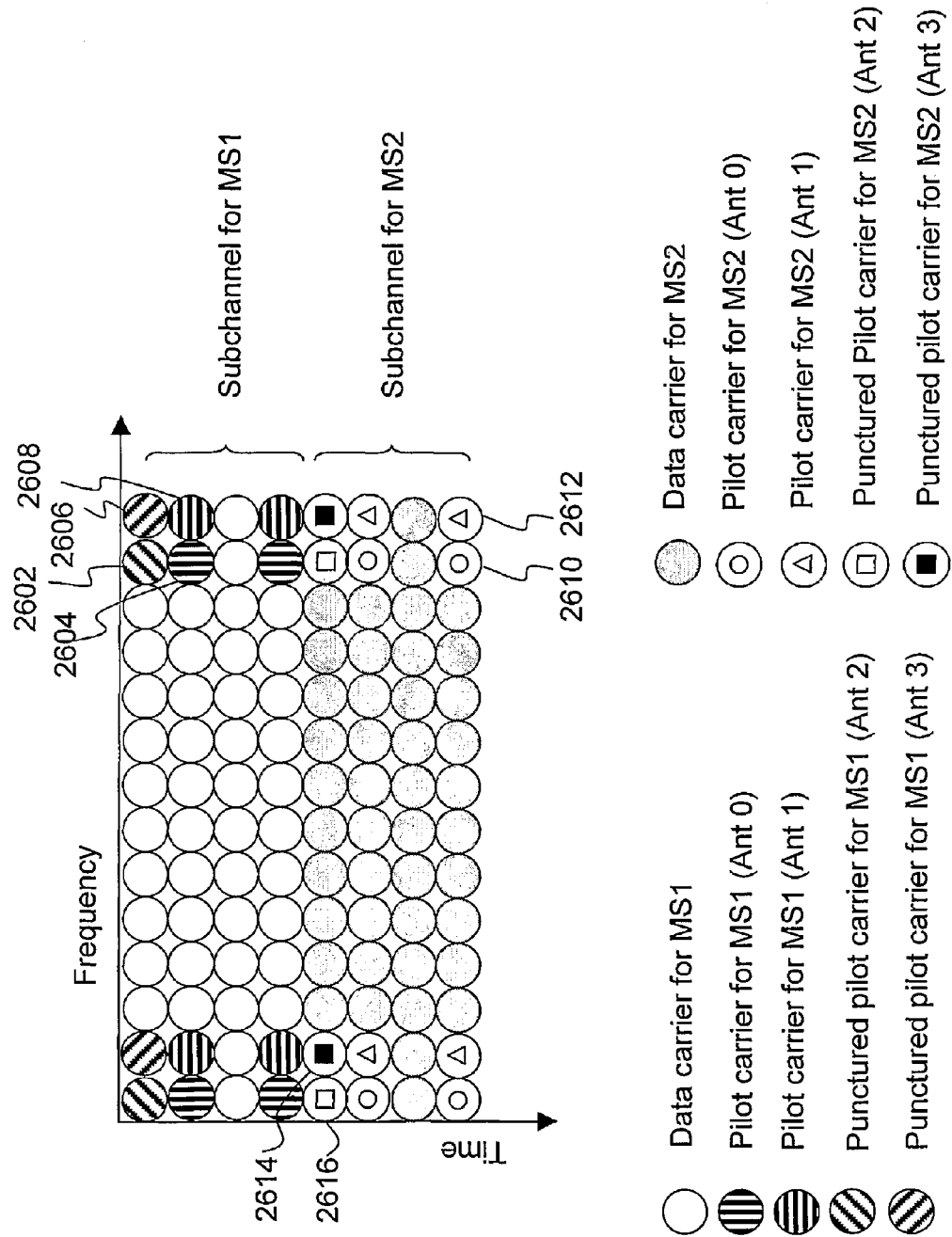
FIG. 26 shows an example of a four-antenna base station for PSUC.

FIG. 26 shows another example for PSUC where each subchannel has dedicated pilots 2602, 2604, 2606, 2608, 2610, 2612, 2614, 2616 for each of the transmit antennas (Ant 0, Ant 1, Ant 2, and Ant 3) of the subscriber stations MS1 and MS2, respectively.

Figure 27:
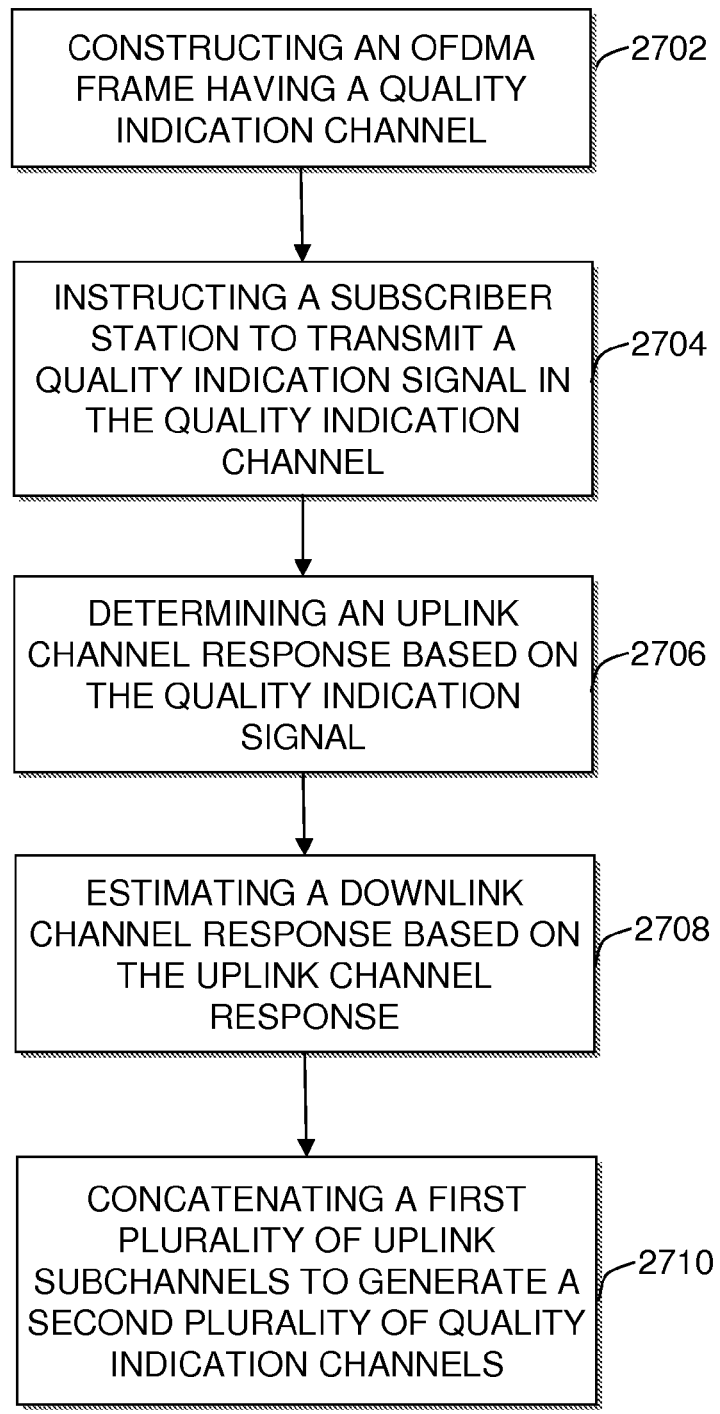
FIG. 27 shows an exemplary method for determining a channel response in an OFDMA system.

FIG. 27 illustrates an exemplary method for determining a channel response in an OFDMA system. An OFDMA frame with a quality indication channel is constructed 2702, the quality indication channel is a modified quality indication channel, the modified quality indication channel comprises mini-tiles selected from uplink tiles of an uplink subchannel. A subscriber station is instructed 2704 to transmit a quality indication signal in the quality indication channel. Based on the quality indication signal an uplink channel response is determined 2706 and a downlink channel response is estimated based on the uplink channel response 2708. A first plurality of uplink subchannels is concatenated 2710 to generate a second plurality of quality indication channels.

Figure 28:
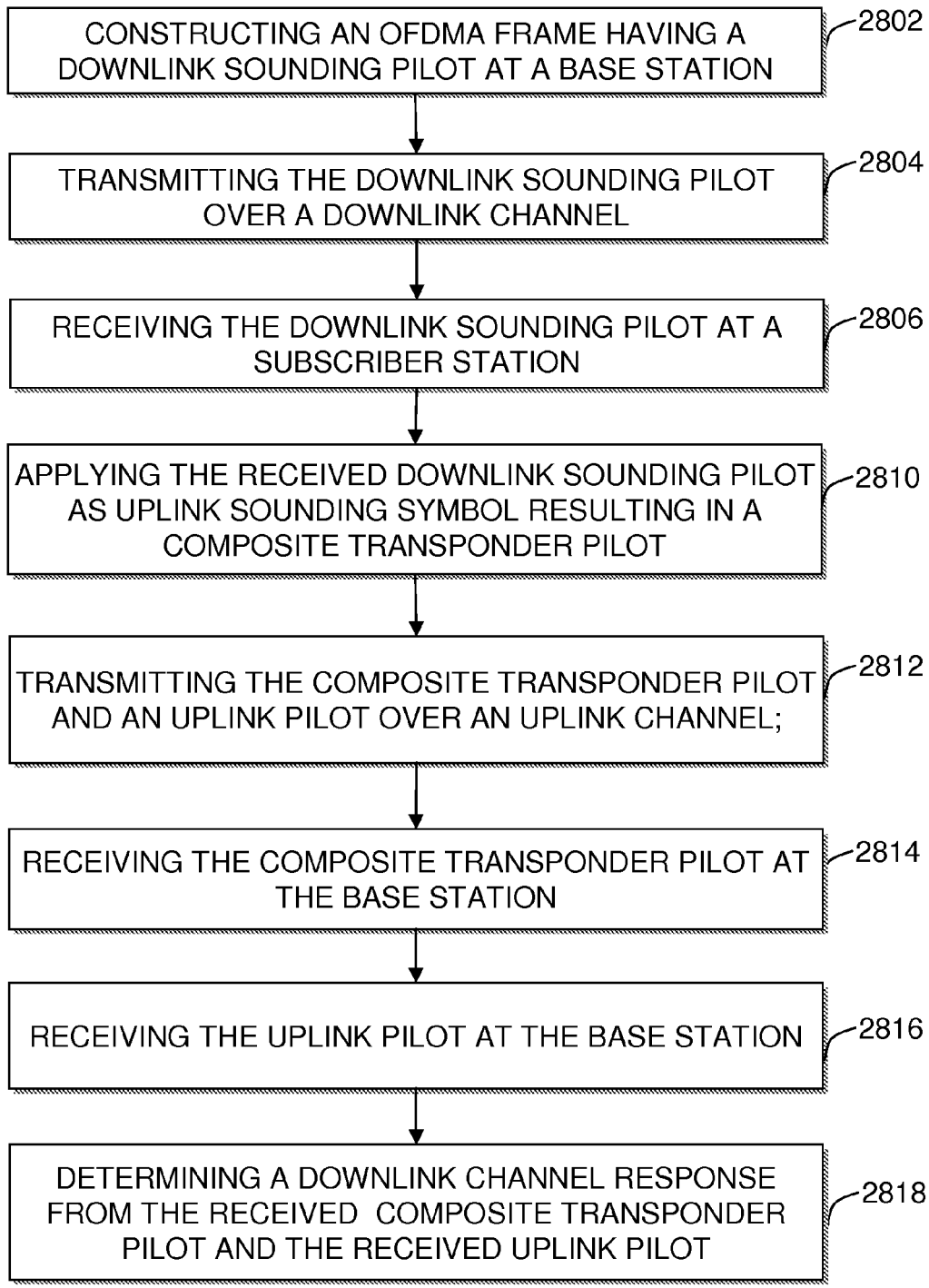
FIG. 28 shows another exemplary method for determining a channel response in an OFDMA system.

FIG. 28 illustrates another exemplary method for determining a channel response in an OFDMA system. An OFDMA frame with a downlink sounding pilot is constructed at a base station 2802. The downlink sounding pilot is then transmitted over a downlink channel 2804, and received at a subscriber station 2806. The received downlink sounding pilot is applied 2810 as uplink sounding symbol, resulting in a composite transponder pilot. The uplink sounding pilot and the composite transponder pilot are transmitted by non-overlap subcarriers in an OFDM symbol. The composite transponder pilot and an uplink pilot are then transmitted over an uplink channel 2812. The composite transponder pilot 2814 and the uplink pilot are received at the base station 2816, respectively. A downlink channel response is determined 2818 from the received composite transponder pilot and the received uplink pilot.

The present invention has been described with regard to one or more embodiments. However, it will be apparent to persons skilled in the art that a number of variations and modifications can be made without departing from the scope of the invention as defined in the claims.

What is claimed is:

1. A method for determining a channel response in an orthogonal frequency division multiplexing access (OFDMA) system comprising the steps of:
    a) constructing an OFDMA frame having a quality indication channel, said quality indication channel being a modified quality indication channel, said modified quality indication channel comprising mini-tiles, said mini-tiles selected from uplink tiles of an uplink subchannel;
    b) instructing a subscriber station to transmit a quality indication signal in said quality indication channel;
    c) determining an uplink channel response based on said quality indication signal; and
    d) estimating a downlink channel response based on said uplink channel response.

2. The method according to claim 1, further comprising the step of: receiving a first plurality of concatenated uplink subchannels generated from a second plurality of quality indication channels.

3. The method according to claim 2, wherein said system is a multiple-input, multiple-output (MIMO) system.

4. The method according to claim 2, wherein said modified quality indication channel is a channel quality indication channel (CQICH).

5. The method according to claim 2, wherein said uplink subchannel is part of a closed-loop system.

6. The method according to claim 2, wherein said uplink subchannel is a partial usage subchannel (PUSC) channel comprising six uplink tiles, said uplink tile comprising four subcarriers crossing three orthogonal frequency division multiplexing (OFDM) symbols, said uplink tile mapped to four mini-tiles, said first plurality and second plurality are equal to four.

7. The method according to claim 2, wherein said uplink subchannel is optional PUSC channel comprising six uplink tiles, said uplink tile comprising three subcarriers crossing three OFDM symbols, said uplink tile mapped to three mini-tiles, said first plurality is equal to three, and second plurality is equal to four.

8. The method according to claim 3, wherein said uplink subchannel is a MIMO PUSC channel comprising six MIMO uplink tiles, said MIMO uplink tile comprising four subcarriers crossing three OFDM symbols, said MIMO uplink tile mapped to 12 mini-tiles, said first plurality and second plurality are equal to two.

9. The method according to claim 3, wherein said uplink subchannel is optional MIMO PUSC channel comprising three MIMO uplink tiles, said MIMO uplink tile comprising three subcarriers crossing two OFDM symbols, said MIMO uplink tile mapped to six mini-tiles, said first plurality is equal to four, and second plurality is equal to three.

10. The method according to claim 1, wherein said system is a time division duplex (TDD) system.

11. A method for determining a channel response in an orthogonal frequency division multiplexing access (OFDMA) system comprising the steps of:
    a) constructing an OFDMA frame having a downlink sounding pilot at a base station;
    b) transmitting said downlink sounding pilot over a downlink channel;
    c) receiving a composite transponder pilot and an uplink pilot over an uplink channel at said base station, said composite transponder pilot resulting from applying the downlink sounding pilot received at a subscriber station as uplink sounding symbol;

d) receiving said uplink pilot at said base station; and e) determining a downlink channel response from the received composite transponder pilot and the received uplink pilot.

12. The method according to claim 11, wherein said system is a multiple-input, multiple-output (MIMO) system.

13. The method according to claim 11, wherein said downlink sounding pilot is a mid-amble.

14. The method according to claim 11, wherein said uplink sounding pilot and said composite transponder pilot are transmitted by non-overlap subcarriers in different OFDM symbols.

15. The method according to claim 12, wherein said composite transponder pilot and said uplink pilot are arranged in the frequency domain according to the antenna configurations in said base station and said subscriber station.

16. The method according to claim 11, wherein said composite transponder pilot is generated from a subset of downlink (DL) pilots transmitted by a DL sounding symbol.

17. The method according to claim 11, wherein said downlink sounding pilot, said composite transponder pilot and said uplink pilot are in an advanced modulation and coding (AMC) zone.

18. The method according to claim 11, wherein said downlink sounding pilot, said composite transponder pilot and said uplink pilot are in a PUSC zone.

19. The method according to claim 11, further comprising the steps of pre-coding a subsequent pilot by the base station, and transmitting said subsequent pilot to the subscriber station.

20. An orthogonal frequency division multiplexing access (OFDMA) system comprising:

a) a subscriber station being adapted to transmit a quality indication signal in a quality indication channel, said quality indication channel being a modified quality indication channel; said modified quality indication channel comprising mini-tiles; said mini-tiles selected from uplink tiles of a uplink subchannel; and b) a base station being adapted to receive said quality indication channel; said base station determining an uplink channel response based on said quality indication signal; and estimating a downlink channel response based on said uplink channel response.

21. The OFDMA system according to claim 20, wherein a first plurality of uplink subchannels are concatenated to generate a second plurality of quality indication channels.

22. The OFDMA system according to claim 21, wherein said OFDMA system is a multiple-input, multiple-output (MIMO) system.

23. The OFDMA system according to claim 21, wherein said modified quality indication channel is a channel quality indication channel (CQICH).

24. The OFDMA system according to claim 21, wherein said uplink subchannel is part of a closed-loop system.

25. An orthogonal frequency division multiplexing access (OFDMA) system comprising:

a) a base station being adapted to transmit a downlink sounding pilot; and to receive a composite transponder pilot and an uplink pilot; said base station determining a downlink channel response from a received composite transponder pilot and a received uplink pilot; said uplink sounding pilot and said composite transponder pilot being transmitted by non-overlap subcarriers in an OFDM symbol, and b) a subscriber station being adapted to receive said downlink sounding pilot; said subscriber station applying the received downlink sounding pilot as uplink sounding symbol resulting in a composite transponder pilot, and transmitting said composite transponder pilot and an uplink pilot over an uplink channel.

26. The OFDMA system according to claim 25, wherein said system is a multiple-input, multiple-output (MIMO) system.

27. The OFDMA system according to claim 25, wherein said downlink sounding pilot is a mid-amble.

28. The OFDMA system according to claim 25, wherein said uplink sounding pilot and said composite transponder pilot are transmitted by non-overlap subcarriers in different OFDM symbols.

29. The OFDMA system according to claim 25, wherein said composite transponder pilot and said uplink pilot are arranged in the frequency domain according to the antenna configurations in said base station and said subscriber station.

30. A base station in an orthogonal frequency division multiplexing access (OFDMA) system comprising:

a) a first circuitry for instructing a subscriber station to transmit a quality indication signal in a quality indication channel;

b) receiver for receiving said quality indication signal;

c) a second circuitry for determining an uplink channel response based on said quality indication signal; and d) a third circuitry for estimating a downlink channel response based on said uplink channel response, wherein said quality indication channel is a modified quality indication channel, said modified quality indication channel comprising mini-tiles;

said mini-tiles selected from uplink tiles of an uplink subchannel.

31. The base station according to claim 30, wherein a first plurality of uplink subchannels is concatenated to generate a second plurality of quality indication channels.

32. The base station according to claim 31, wherein said system is a multiple-input, multiple-output (MIMO) system.

33. The base station according to claim 31, wherein said modified quality indication channel is a channel quality indication channel (CQICH).

34. A base station in an orthogonal frequency division multiplexing access (OFDMA) system comprising:

a) a transmitter for transmitting a downlink sounding pilot over a downlink channel;

b) a receiver for receiving a composite transponder pilot; and an uplink pilot at said base station; said composite transponder pilot resulting from said downlink sounding pilot being applied as uplink sounding symbol, said uplink sounding pilot and said composite transponder pilot being transmitted by non-overlap subcarriers in an OFDM symbol; and c) a circuitry for determining a down link channel response from the received composite transponder pilot and the received uplink pilot.

35. The base station according to claim 34, wherein said system is a multiple-input, multiple-output (MIMO) system.

36. The base station according to claim 34, wherein said downlink sounding pilot is a mid-amble.

37. The base station according to claim 34, wherein said uplink sounding pilot and said composite transponder pilot are transmitted by non-overlap subcarriers in different OFDM symbols.

38. A subscriber station in an orthogonal frequency division multiplexing access (OFDMA) system comprising:

a) a transmitter for transmitting a quality indication signal in a quality indication channel; said quality indication signal for determining an uplink channel response, said quality indication channel being a modified quality indication channel, said modified quality indication channel comprising mini-tiles, said mini-tiles selected from uplink tiles of an uplink subchannel; and b) a combining circuitry for concatenating a first plurality of uplink subchannels to generate a second plurality of modified quality indication channels.

39. The subscriber station according to claim 38, wherein a first plurality of uplink subchannels is concatenated to generate a second plurality of quality indication channels.

40. The subscriber station according to claim 38, wherein said system is a multiple-input, multiple-output (MIMO) system.

41. The subscriber station according to claim 38, wherein said modified quality indication channel is a channel quality indication channel (CQICH).

42. The subscriber station according to claim 38, wherein said uplink subchannel is part of a closed-loop system.

43. A subscriber station in an orthogonal frequency division multiplexing access (OFDMA) system comprising:

a) a receiver for receiving a downlink sounding pilot;

b) a converter for applying the received downlink sounding pilot as a uplink sounding symbol resulting in a composite transponder pilot, said downlink sounding pilot and said composite transponder pilot being transmitted by non-overlap subcarriers in an OFDM symbol; and c) a transmitter for transmitting said composite transponder pilot and an uplink pilot over an uplink channel; said composite transponder pilot and the received uplink pilot used for determining a down link channel response.

44. The subscriber station according to claim 43, wherein said system is a multiple-input, multiple-output (MIMO) system.

45. The subscriber station according to claim 43, wherein said downlink sounding pilot is a mid-amble.

46. The subscriber station according to claim 43, wherein said downlink sounding pilot and said composite transponder pilot are transmitted by non-overlap subcarriers in different OFDM symbols.

* * * * *